United States Patent
Kodali et al.

(10) Patent No.: US 9,537,612 B2
(45) Date of Patent: Jan. 3, 2017

(54) RESTRICTIONS ON TRANSMISSIONS OF CONTROL PLANE DATA WITH CARRIER AGGREGATION

(71) Applicant: Apple Inc., Cupertino, CA (US)

(72) Inventors: Sree Ram Kodali, Sunnyvale, CA (US); Shivesh Makharia, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 14/503,106

(22) Filed: Sep. 30, 2014

(65) Prior Publication Data

US 2015/0163041 A1    Jun. 11, 2015

Related U.S. Application Data

(60) Provisional application No. 61/913,725, filed on Dec. 9, 2013.

(51) Int. Cl.
| | |
|---|---|
| *H04L 1/16* | (2006.01) |
| *H04L 1/18* | (2006.01) |
| *H04W 72/04* | (2009.01) |
| *H04L 5/00* | (2006.01) |

(52) U.S. Cl.
CPC ............ *H04L 1/1812* (2013.01); *H04L 1/189* (2013.01); *H04W 72/042* (2013.01); *H04L 5/001* (2013.01); *H04L 5/0041* (2013.01)

(58) Field of Classification Search
None
See application file for complete search history.

(56) References Cited

U.S. PATENT DOCUMENTS

| | | | | |
|---|---|---|---|---|
| 2011/0317659 | A1* | 12/2011 | Ramachandran . | H04W 36/0022 370/331 |
| 2014/0050086 | A1* | 2/2014 | Himayat ............ | H04N 21/2365 370/230 |
| 2014/0128115 | A1* | 5/2014 | Siomina ............... | H04L 1/0015 455/501 |
| 2014/0155109 | A1* | 6/2014 | Vaidya .................... | H04W 8/06 455/458 |
| 2014/0192657 | A1* | 7/2014 | Gunnarsson ........... | H04W 8/26 370/241.1 |
| 2014/0220970 | A1* | 8/2014 | Yang ..................... | H04W 48/20 455/434 |

(Continued)

*Primary Examiner* — Phirin Sam
(74) *Attorney, Agent, or Firm* — Downey Brand LLP

(57) ABSTRACT

The disclosure describes apparatus and methods for communicating control plane data with a mobile device in a Long Term Evolution (LTE) network employing carrier aggregation. A network apparatus, such as an enhanced NodeB (eNodeB) or a mobility management entity (MME), can be configured to evaluate a measurement report (MR) received from a mobile device for one or more radio frequency (RF) conditions associated with a primary network cell and one or more RF conditions associated with a secondary network cell. Then, based on the evaluation, the network apparatus can determine to communicate the control plane data with the mobile device via the primary network cell, the secondary network cell, or both. The control plane data can correspond to non-access stratum (NAS) information, radio resource control (RRC) information, or a hybrid automatic repeat request (HARQ) retransmission of previously transmitted control plane data.

20 Claims, 15 Drawing Sheets

(56) References Cited

U.S. PATENT DOCUMENTS

| | | | | |
|---|---|---|---|---|
| 2014/0349653 A1* | 11/2014 | Kanamarlapudi | .... | H04W 36/36 455/437 |
| 2015/0208274 A1* | 7/2015 | Himayat | ............ | H04N 21/2365 370/230 |
| 2015/0282118 A1* | 10/2015 | Vaidya | .................... | H04W 8/06 455/458 |
| 2015/0289282 A1* | 10/2015 | Phuyal | .................. | H04W 56/00 370/329 |
| 2015/0305070 A1* | 10/2015 | Ahmad | ................ | H04W 48/20 370/338 |
| 2016/0044567 A1* | 2/2016 | Baghel | ................. | H04W 28/08 370/331 |
| 2016/0198360 A1* | 7/2016 | Smith | ............... | H04W 28/0289 370/237 |

* cited by examiner

RESTRICTIONS ON TRANSMISSIONS OF CONTROL PLANE DATA WITH CARRIER AGGREGATION

CROSS REFERENCE TO RELATED APPLICATION(S)

This application claims priority to U.S. Provisional Application No. 61/913,725, filed on Dec. 9, 2013, and entitled "RESTRICTIONS ON TRANSMISSIONS OF CONTROL PLANE DATA WITH CARRIER AGGREGATION," which is incorporated by reference herein in its entirety for all purposes.

FIELD

The described embodiments generally relate to wireless communications, and more particularly, to procedures for effectively communicating control-plane data between a network entity and a mobile device within different carrier aggregation scenarios.

BACKGROUND

Fourth generation (4G) cellular networks employing newer radio access technology systems that implement the $3^{rd}$ Generation Partnership Project (3GPP) Long Term Evolution (LTE) and LTE Advanced (LTE-A) standards are rapidly being developed and deployed within the United States and abroad. LTE-A brings with it the aggregation of multiple component carriers (CCs) to enable this wireless communications standard to meet the bandwidth requirements of multi-carrier systems that cumulatively achieve data rates not possible by predecessor LTE versions.

Within both LTE and LTE-A telecommunication networks, the mobility management entity (MME) and the enhanced NodeB (eNodeB) base station are independently responsible for implementing various control-plane signaling procedures. For example, the MME is responsible for establishing and releasing radio bearer connections for user equipment (UE), affecting UE transitions from idle mode to connected mode (and vice versa) by generating corresponding paging messages, implementing various communication security features, etc. This functionality is referred to as the Non-Access Stratum (NAS) within the LTE protocol architecture, which represents operations and communications between the evolved packet core (EPC) and the UE; the Access Stratum (AS) represents operations and communications between the eNodeB and the UE within the LTE protocol architecture.

The eNodeB is responsible for various radio resource control (RRC) control-plane activities, including system information broadcasting, transmitting paging messages emanating from MMEs, RRC parameter configuration for UEs, network cell selection and reselection procedures, measurement and reporting configuration for UEs, etc. In various implementations, RRC control plane signaling may be performed in conjunction with one or more of the following LTE protocol entities or layers: the packet data convergence protocol (PDCP), the radio link control (RLC) layer, the medium access control (MAC) layer, and the physical (PHY) layer. Further, both control-plane data and user-plane data can be multiplexed within the MAC layer and communicated to an intended recipient via the PHY layer, in the downlink (DL) or in the uplink (UL), during the same transmission time interval (TTI).

Regardless of which network device, e.g., an MME or an eNodeB in the DL, or a UE in the UL, is communicating LTE control-plane data, it is generally understood that control-plane data consists of time-sensitive information that must be communicated between or amongst various network devices in an efficient and predictable manner. Unfortunately, in modern LTE-A networks, which employ carrier aggregation to increase cumulative communications bandwidth and improve communications throughput, control-plane signaling (e.g., NAS or RRC communications) is not always designated to the most appropriate DL or UL communication resource, to ensure timely reception of sensitive control-plane data by one or more intended recipients. In fact, the present 3GPP LTE-A standard (i.e., relating to Releases 10-12) is silent with respect to identifying which network entity (e.g., a primary carrier cell or a secondary carrier cell) is designated to communicate control-plane data corresponding to one or more component carrier network cells during various DL communications.

As such, there exists a need for solutions that restrict control-plane data communications to pre-designated network entities or to dynamically-designated network entities as changing network conditions may require, particularly in view of various unanticipated radio link failure (RLF) scenarios. In this regard, it would be beneficial to improve the likelihood of communicating control-plane data in a timely manner within LTE-A networks employing carrier aggregation.

SUMMARY

This disclosure describes apparatus and procedures for communicating control plane data between a network apparatus and a mobile device within a Long Term Evolution (LTE) network employing carrier aggregation. In various embodiments, a network apparatus, e.g., an enhanced NodeB (eNodeB) base station or a mobility management entity (MME), can be configured to evaluate one or more network conditions associated with a primary network cell and one or more network conditions associated with a secondary network cell, determine when to communicate control plane data, e.g., corresponding to non-access stratum (NAS) information or radio resource control (RRC) information, with the mobile device via the primary network cell or the secondary network cell based at least in part on the evaluations of the network conditions. Thereafter, the network apparatus can be configured to send the control plane data to the mobile device via the primary network cell or the secondary network cell, or both.

In accordance with some aspects, the primary network cell may be a primary carrier cell of the mobile device and the secondary network cell may be a secondary carrier cell of the mobile device, where both the primary carrier cell (PCC) and secondary carrier cell (SCC) support carrier aggregation for the mobile device within the LTE network.

In various implementations, the primary network cell and the secondary network cell can be configured as inter-band non-contiguous component carriers that respectively utilize different frequency resources within different radio frequency (RF) bands for communicating with the mobile device.

In other aspects, the network apparatus can be configured to receive a measurement report (MR) from the mobile device, where the MR includes information corresponding to the one or more network conditions associated with the primary network cell, as well as information corresponding to the one or more network conditions associated with the secondary network cell.

In some scenarios, the MR may comprise one or more of a channel quality indicator (CQI), a pre-coding matrix indicator (PMI), and a rank indicator (RI) for the primary network cell, and one or more of a CQI, a PMI, and a RI for the secondary network cell. Further, the one or more network conditions associated with the primary network cell can be measured RF conditions of the primary network cell that comprise at least one of a reference signal received power (RSRP), a received signal strength indication (RSSI), and a signal to interference plus noise ratio (SINR). Similarly, the one or more network conditions associated with the secondary network cell can be measured RF conditions of the secondary network cell that comprise at least one of a RSRP, a RSSI, and a SINR.

In some aspects, the network apparatus can be configured to evaluate at least one of a circuit-switched fallback (CSF) condition for the mobile device and block error rate (BLER) information for instantaneous downlink hybrid automatic repeat request (HARQ) at the network apparatus or for instantaneous uplink HARQ at the mobile device, and then determine to send the control plane data to the mobile device via the primary network cell or the secondary network cell based at least in part on evaluating at least one of the CSF condition for the mobile device and/or the corresponding BLER information.

In other aspects, the network apparatus can be configured to determine to send the control plane data to the mobile device via the primary network cell when the one or more network conditions associated with the primary network cell are better than the one or more network conditions associated with the secondary network cell, determine to send the control plane data to the mobile device via the secondary network cell when the one or more network conditions associated with the secondary network cell are better than the one or more network conditions associated with the primary network cell, or alternatively, determine to send the control plane data to the mobile device via the primary network cell by default (e.g., when the secondary network cell is assumed to be a less desirable option for communicating control plane data with the mobile device by the network).

In one embodiment, the control plane data can be transmitted to the mobile device via the primary network cell or the secondary network cell during a network selected time interval; alternatively, the control plane may not be transmitted to the mobile device until a MR is received from the mobile device.

In various embodiments, a network apparatus can comprise one or more processors and a storage device storing executable instructions that, when executed by the one or more processors, cause the network apparatus to receive a MR from a user equipment (UE) communicating within an LTE network, evaluate the MR to determine to communicate control plane data with the UE using a PCC or a SCC, wherein the PCC and the SCC support carrier aggregation for the UE within the LTE network, and send the control plane data to the UE via the PCC or the SCC.

In some aspects, execution of the executable instructions can further cause the network apparatus to determine to communicate the control plane data with the UE via the PCC and the SCC when the MR indicates that RF conditions are poor for the UE within the LTE network, and send duplicate copies of the control plane data to the UE via the PCC and the SCC. In this regard, the duplicate copies of the control plane data can be HARQ retransmissions of control plane data that was previously sent to the UE via the PCC or the SCC.

In other aspects, execution of the executable instructions may further cause the network apparatus to determine to communicate the control plane data with the UE via the PCC when the MR indicates that RF conditions for the PCC are better than RF conditions for the SCC, or alternatively, determine to communicate the control plane data with the UE via the SCC when the MR indicates that RF conditions for the SCC are better than RF conditions for the PCC. In either scenario, the control plane data sent to the UE via the PCC or the SCC may be a HARQ retransmission of control plane data that was previously sent to the UE via the PCC or the SCC.

In some embodiments, a non-transitory computer readable medium can store executable instructions that, when executed by one or more processors of a network apparatus, cause the network apparatus to receive a MR from a UE communicating within an LTE network, evaluate the MR to determine to communicate control plane data with the UE using a PCC and a SCC when the MR indicates that RF conditions are poor for the UE within the LTE network, where the PCC and the SCC support carrier aggregation for the UE, and then send duplicate copies of the control plane data to the UE via the PCC and the SCC.

In various implementations, the duplicate copies of the control plane data can be HARQ retransmissions of control plane data that was previously sent to the UE via the PCC or the SCC.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
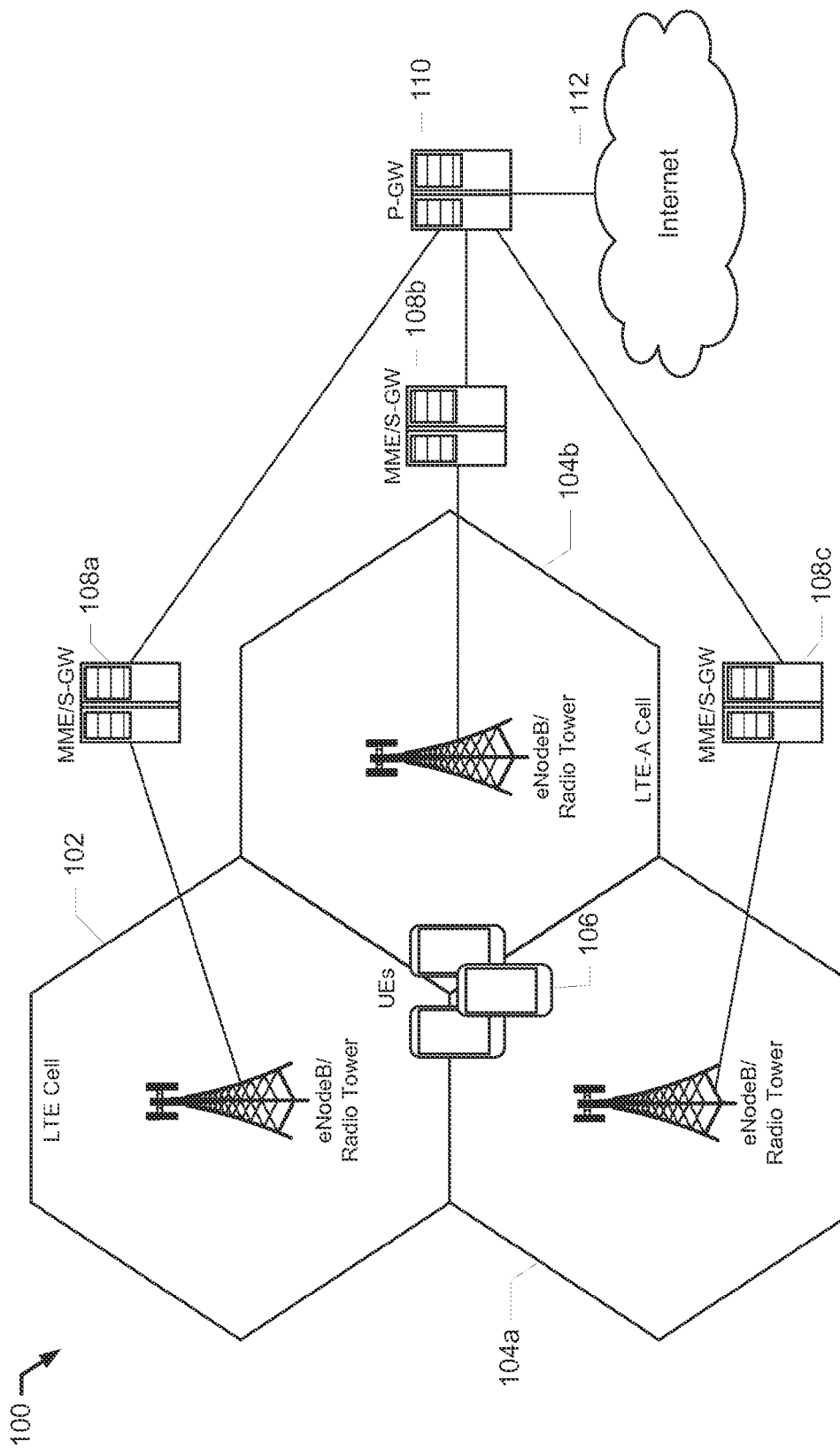
FIG. 1 shows a wireless communication network including Long Term Evolution (LTE) and LTE Advanced (LTE-A) network cells supporting multiple user equipment devices (UEs), which can be configured to communicate control-plane data in the downlink (DL) or in the uplink (UL), in accordance with various embodiments of the disclosure.

Representative examples for designating one or more network entities to transmit long term evolution (LTE) control-plane data in the downlink (DL) and/or in the uplink (UL) are described within this section. Further, various examples for performing selective and dynamic LTE hybrid automatic repeat request (HARQ) retransmissions of control-plane data, are also described herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11 ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 depicts a wireless communication system 100 that is compliant with the 3GPP Evolved Universal Terrestrial Radio Access (E-UTRA) air interface, and includes, but is not limited to including, one LTE network cell 102 and two LTE-A network cells 104a-b, respectively having enhanced NodeB (eNodeB) base stations (e.g., depicted as radio towers) that can communicate between and amongst each other via the LTE-X2 interface. Further, the E-UTRA compliant communication system 100 can include any number of mobility management entities (MMEs) 108a-c, serving gateways (S-GWs) 108a-c, PDN gateways (P-GWs) 110, etc., which, as part of the evolved packet core (EPC), can communicate with any of the LTE and LTE-A cell, 102 and 104a-b, eNodeBs via the LTE-S1 interface. Additionally, the E-UTRA communication system 100 can include any number of UEs 106 that may be provided wireless communications service by one or more of the eNodeBs of the LTE and LTE-A cells, 102 and 104a-b, at any particular time.

By way of example, a UE 106 may be located within one or more LTE-A cell(s) 104a-b and in an LTE radio resource control (RRC) connected mode when it initiates a voice over LTE (VoLTE) application to establish a voice call. The UE 106 running the VoLTE application can place a VoLTE voice call to an intended recipient by communicating voice data to a serving eNodeB, which forwards the call through the EPC, 108a-c and 110, and thereby connects to the Internet 112 to transfer the VoLTE communications through an IP Multimedia Subsystem (IMS) network between the caller UE 106 and a receiving device of the intended recipient, which may be a part of a remote network. Alternatively, the UE 106 can initiate any number of different UE-resident applications that may be respectively associated with a particular data type, e.g., streaming audio data, streaming audio-video data, website data, text data, etc., to attempt to transfer IP-based application data via its serving LTE-A network cell(s) 104a-b over the Internet 112.

In various embodiments, any of the MMEs 108a-c and/or any of the eNodeB base stations of the LTE-A cells 104a-b, which are capable of supporting carrier aggregation, can be configured to communicate control-plane data to any of the UEs 106 in the DL. Alternatively, any of the UEs 106 may be capable of communicating control-plane data via any of the LTE-A cells 104a-b in the UL. In this regard, it should be understood that the MMEs 108a-b can perform Non-Access Stratum (NAS) control-plane signaling between the EPC and the UE 106 via the eNodeB over the radio access network (RAN) portion of the network. In some scenarios, NAS signaling can include, but is not limited to including, procedures for establishing and releasing radio bearer connections for user equipment (UE), affecting UE transitions from idle mode to connected mode (and vice versa) by generating corresponding paging messages, implementing various communication security features, etc.

Further, the eNodeB base stations of the LTE-A cells 104a-b can be configured to perform various radio resource control (RRC) control-plane signaling procedures, including, but not limited to including, system information broadcasting, transmitting paging messages emanating from MMEs, RRC parameter configuration for UEs, network cell selection and reselection procedures, measurement and reporting configuration for UEs, etc. In various implementations, RRC control plane signaling may be performed in conjunction with one or more of the following LTE protocol entities or layers: the packet data convergence protocol (PDCP), the radio link control (RLC) layer, the medium access control (MAC) layer, and the physical (PHY) layer. It should be understood that control-plane data and user-plane data can be multiplexed within the MAC layer and communicated to an intended recipient via the PHY layer, in the downlink (DL) or in the uplink (UL), e.g., during the same transmission time interval (TTI).

Figure 2:
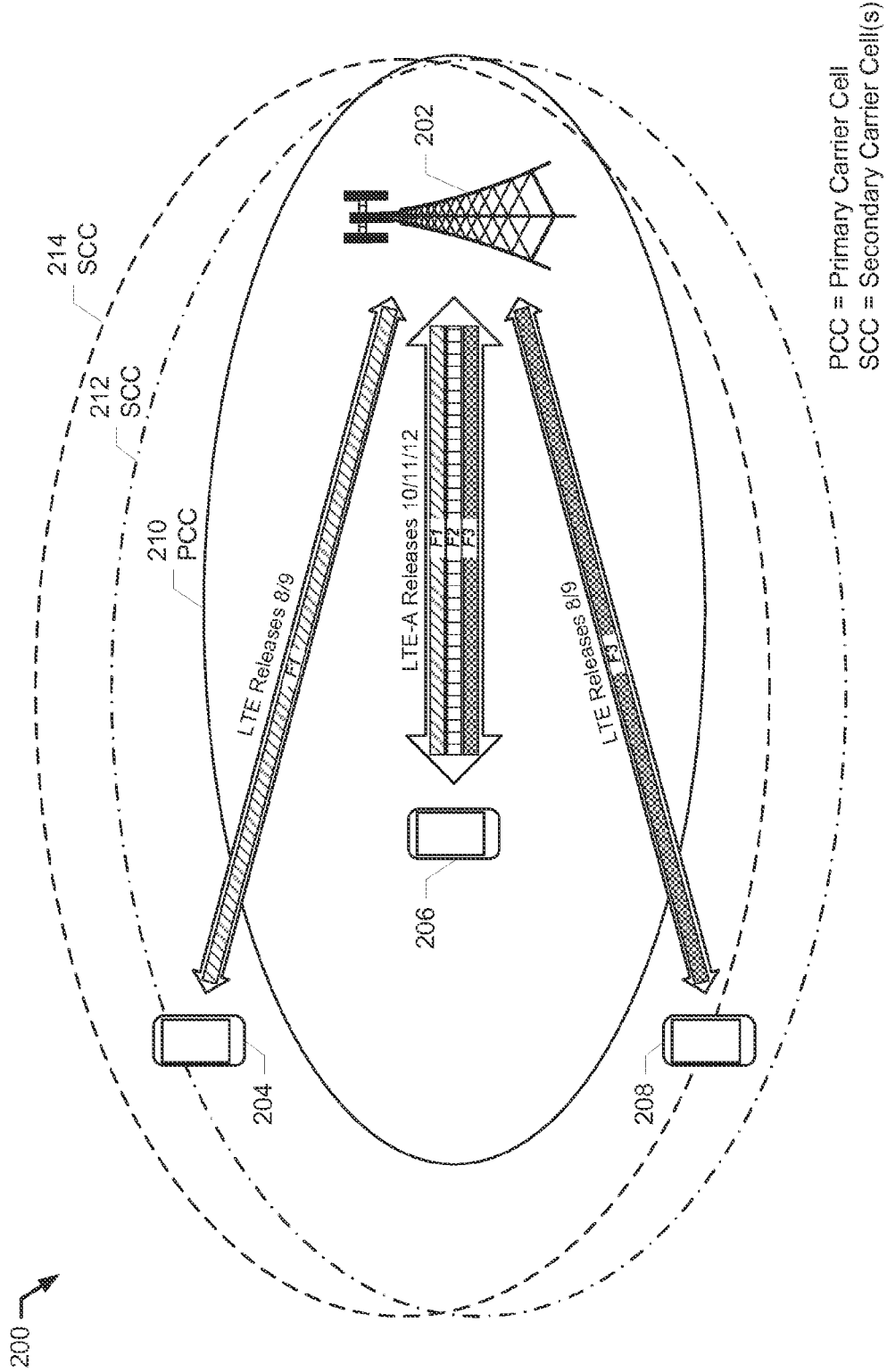
FIG. 2 shows a wireless communication network diagram depicting an LTE-A compliant UE that is in communications with a primary carrier cell (PCC) and two secondary carrier cells (SCCs) in a carrier aggregation scenario, in accordance with various implementations of the disclosure.

FIG. 2 shows a wireless communication network diagram 200 depicting an LTE-A compliant UE 206 that is in communications with a primary carrier cell (PCC) 210 and two secondary carrier cells (SCCs), 212 and 214, in a carrier aggregation scenario. By way of example, and with reference to 3GPP LTE-A Releases 10, 11, and 12, the LTE-A compliant UE 206 can communicate control-plane data with the eNodeB base station 202 (e.g., in the DL or the UL) that can have multiple antennas for providing radio coverage via three distinct radio frequency resources, F1, F2, and F3, which are individual component carriers (CCs) for communications that can be provided to UE 206 in aggregate, to increase communications bandwidth and throughput. From the perspective of the LTE-A compliant UE 206, the CC radio frequency resource F1 can be associated with the PCC 210, the CC radio frequency resource F2 can be associated with the SCC 212, and the CC radio frequency resource F3 can be associated with the SCC 214. Alternative carrier aggregation representations for this frequency resource scenario will be described further herein for FIGS. 3A-C.

The communication network diagram 200 also depicts two LTE compliant UEs, 204 and 208, with reference to 3GPP LTE Releases 8 and 9, which are not capable of communicating using carrier aggregation. By way of example, the LTE compliant UE 204 can communicate control-plane data with the eNodeB base station 202 (in the DL or the UL) via a single frequency resource F1, and the LTE compliant UE 208 may be configured to communicate control-plane data with the eNodeB base station 202 (in the DL or the UL) via a single frequency resource F3. In the single carrier scenario, LTE compliant UEs, 204 and 208, employ individual standard-designated system bandwidths that limit achievable data rate throughput to roughly 300 Mbits/sec. in the DL, and roughly 75 Mbits/sec. in the UL (real world implementations may vary).

Figure 3A:
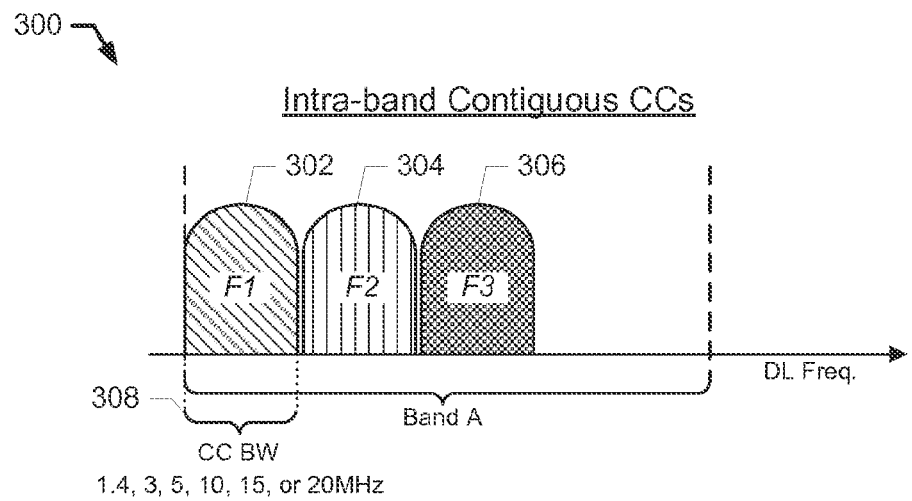
FIGS. 3A-C show three distinct carrier aggregation representations that depict two intra-band component carrier (CC) frequency resource diagrams and one inter-band CC frequency resource diagram, in accordance with various embodiments of the disclosure.
Figure 3B:
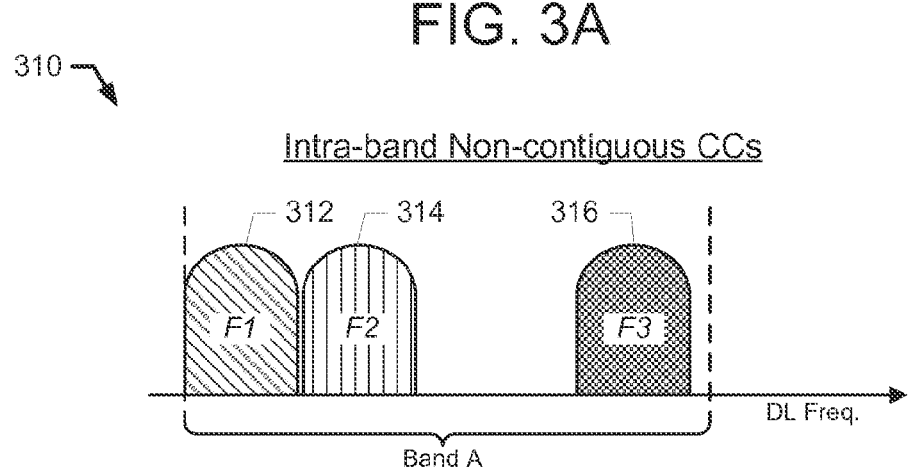
Figure 3C:
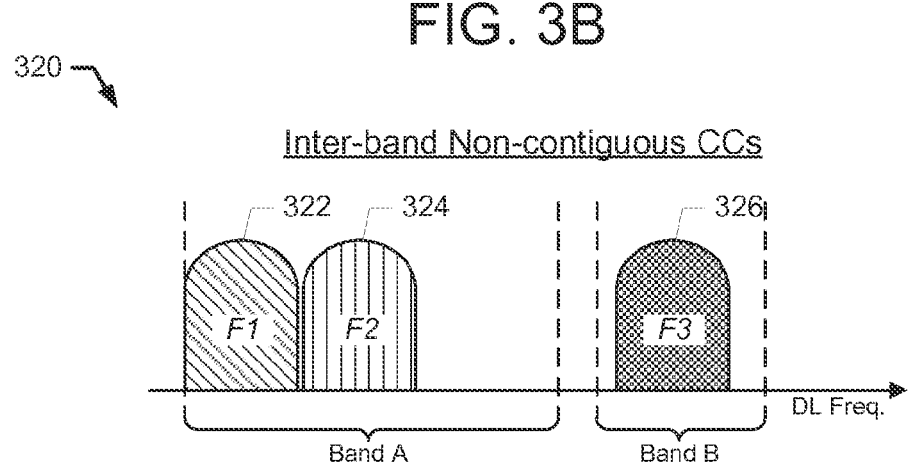

FIGS. 3A-C show three distinct carrier aggregation representations depicting two intra-band CC frequency resource diagrams, 300 and 310, and one inter-band CC frequency resource diagram 320, in accordance with various embodiments. As is generally understood, in 3GPP LTE and LTE-A, an individual CC is limited to communicating at various designated system bandwidths 308 ranging from 1.4 MHz up to 20 MHz. As such, the cumulative DL data rate throughput achievable in carrier aggregation scenarios can increase the single carrier data-rate throughput of roughly 300 Mbits/sec. by some multiplier value, relating to the number of CCs employed (up to 5 CCs in LTE-A).

FIG. 3A shows a carrier aggregation representation depicting an intra-band contiguous CC frequency resource diagram 300, where each aggregated CC, 302, 304, and 306, is associated with its own distinct frequency resource, F1, F2, or F3, within the same service provider designated DL frequency band, Band A. In the intra-band contiguous CC scenario, the three frequency resources, F1, F2, and F3, are sequential CC frequencies in the frequency domain.

FIG. 3B shows a carrier aggregation representation depicting an intra-band non-contiguous CC frequency resource diagram 310, where each aggregated CC, 312, 314, and 316, is associated with its own distinct frequency resource, F1, F2, or F3, within a single DL frequency band, Band A. However, in the intra-band non-contiguous CC scenario 310, the three frequency resources, F1, F2, and F3, can be CC frequencies that are respectively separated by one or more intervening frequencies in the frequency domain, within Band A.

FIG. 3C shows a more common carrier aggregation representation depicting an inter-band non-contiguous CC frequency resource diagram 320, where each aggregated CC, 322, 324, and 326, is associated with its own distinct frequency resource, F1, F2, or F3, within multiple service provider designated DL frequency bands, Band A and Band B. In the inter-band non-contiguous CC scenario, the frequency resources, F1 and F2, of Band A can be CC frequencies that are separated from the frequency resource F3 of Band B in the frequency domain. For reference, 3GPP LTE-A Release 10 discusses carrier aggregation for LTE, and LTE-A Releases 11 and 12 describe various carrier aggregation enhancements including various inter-band CC band pairings. It should be understood that telecommunications service providers generally operate using both similar and dissimilar licensed LTE frequency spectrum bands. For example, within the United States, Verizon's® LTE networks operate in the 700 and 1700/2100 Mhz frequency spectra using Bands 13 and 4, whereas AT&T's® LTE networks operate in the 700, 1700/2100, and 2300 MHz frequency spectra using Bands 17, 4, and 30.

For telecommunication networks employing LTE-A, interoperability with predecessor LTE versions requires an LTE-A CCs to employ a system bandwidth equivalent to its earlier LTE version counterparts. As such, the peak single CC LTE-A system bandwidth is capped at 20 MHz for inter-LTE RAT compatibility. However, in various carrier aggregation scenarios, an aggregate set of LTE-A CCs may be able to achieve cumulative bandwidths of up to 100 MHz (5 CCs×20 MHz, the maximum LTE standard system bandwidth) using one or more allocated LTE spectrum bands. Generally, UEs operating within LTE 102 and/or LTE-A 104a-b network cells employ operating bandwidths that mirror a serving cell(s) system bandwidth; this implementation ensures that sufficient radio resources are allocated to support different UE data type communications, having varying quality of service (QOS) requirements.

Figure 4:
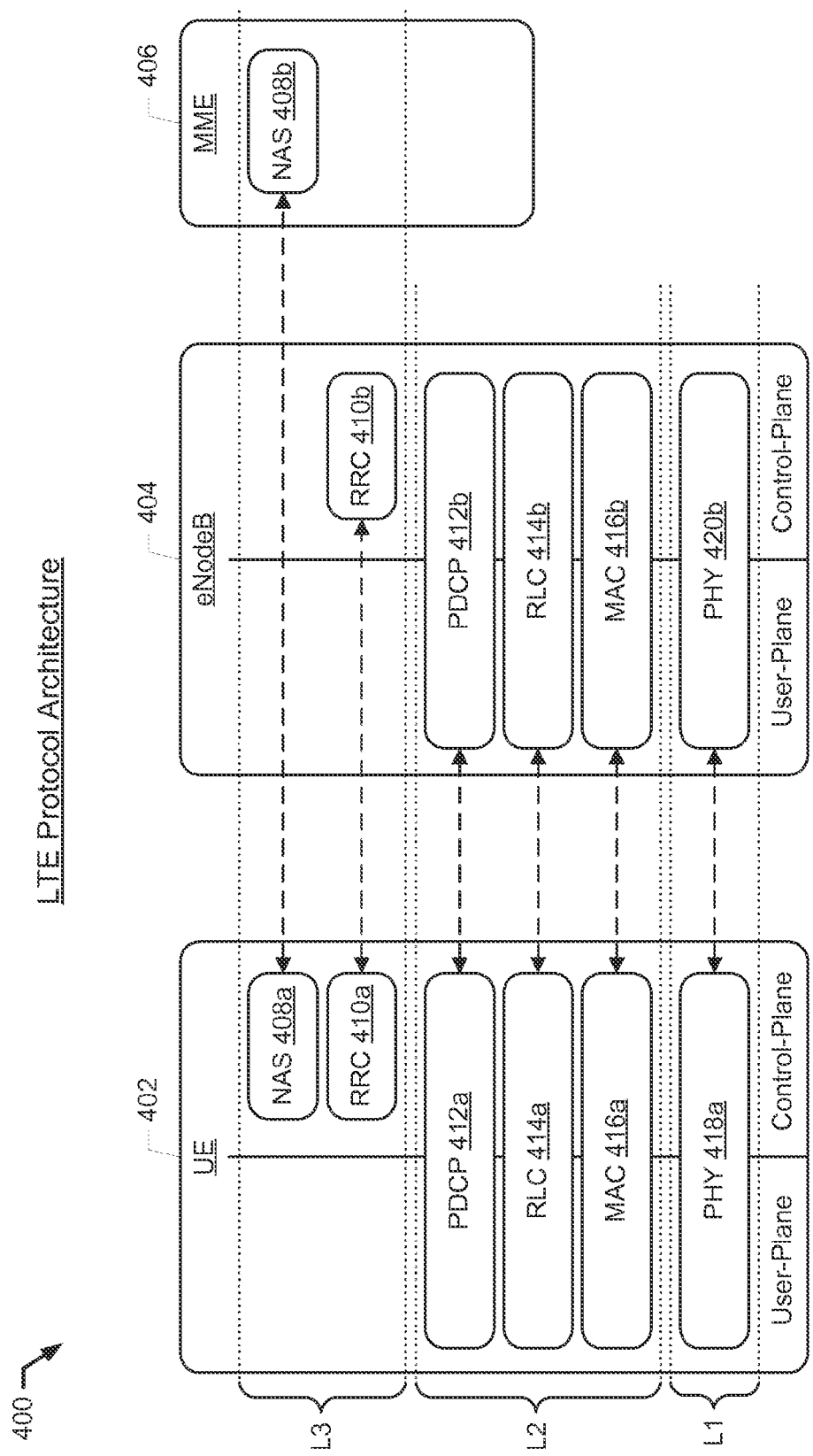
FIG. 4 shows a block diagram of the LTE protocol architecture that delineates control-plane communications from user-plane communications, in accordance with some implementations of the disclosure.

FIG. 4 shows a block diagram of the LTE protocol architecture 400 that delineates the control-plane from the user-plane amongst UE 402, eNodeB 404, and MME 406 entities, in accordance with various implementations of the disclosure. As previously discussed, NAS signaling 408a-b and RRC signaling 410a-b are associated with pure control-plane data communications within the LTE Protocol Architecture stack 400, whereas PDCP layer communications 412a-b, RLC layer communications 414a-b, MAC layer communications 416a-b, and PHY layer communications 418a-b may comprise both control-plane and user-plane communications, depending on a particular implementation.

As is generally understood, the PDCP layer 412a-b may be responsible for header de/compression of Internet Protocol (IP) data, transfer of both control-plane and user-plane data, maintenance of PDCP sequence numbers (SNs), in-sequence delivery of upper layer protocol data units (PDUs) for lower layer reestablishments, duplicate elimination of lower layer service data units (SDUs) for lower layer reestablishments of radio bearers mapped on the RLC layer 414a-b, de/ciphering of control-plane and user-plane data, integrity protection and verification of control-plane data, etc. The RLC layer 414a-b may be responsible for transferring upper layer PDUs, error-correction signaling, concatenation, segmentation and reassembly of RLC SDUs, re-segmentation of RLC data PDUs, reordering of RLC data PDUs, duplicate detection, RLC SDU discarding, RLC reestablishment, error detection, etc.

The MAC layer 416a-b may be responsible for mapping between logical channels and transport channels, multiplexing of MAC SDUs from various logical channels onto transport blocks (TBs) to be delivered to the PHY layer 418a-b on transport channels, demultiplexing of MAC SDUs from various logical channels from TBs delivered from the PHY layer 418a-b on transport channels, scheduling information reporting, error-correction through HARQ signaling, priority handling between and amongst UEs via dynamic scheduling, priority handling between logical channels of a UE, logical channel prioritization, etc. The PHY layer 418a-b may be responsible for transferring information from various MAC layer 416a-b transport channels over the E-UTRA air interface, controlling adaptive modulation and coding (AMC), performing Tx power control procedures, performing cell searching during synchronization and handover procedures, communication channel measurements for the RRC layer 410a-b, etc.

Figure 5:
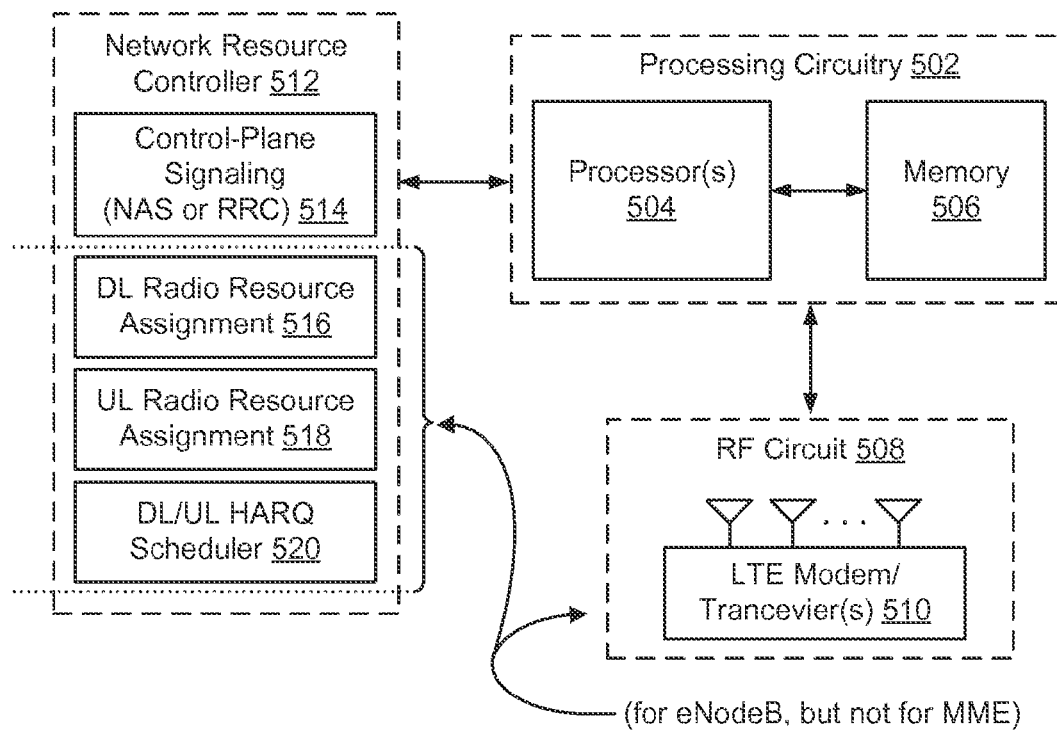
FIG. 5 shows a network apparatus (e.g., an eNodeB or an MME) including a network resource controller having a control-plane signaling component and a DL/UL HARQ scheduler component, in accordance with various embodiments.

FIG. 5 shows a network apparatus 500 that may be representative of an eNodeB 404 or an MME 406, in accordance with various embodiments. In one scenario, the network apparatus 500 may be a MME 406 that includes a network resource controller 512 with a control-plane signaling component 514 that is capable of performing various NAS functions (described in further detail herein), and processing circuitry 502 including one or more processors 504 and a memory component 506. In another scenario, the network apparatus 500 may be an eNodeB 404 base station that includes a network resource controller 512 with a control-plane signaling component 514 that is capable of performing various RRC functions (described in further detail herein), a DL radio resources assignment component 516, an UL radio resource assignment component 518, and a DL/UL HARQ scheduler 520, as well as, processing circuitry 502 including one or more processor(s) 504 and a memory component 506, and an RF circuit 508 that includes an LTE modem and one or more wireless communications transceivers.

When the network apparatus 500 is representative of an eNodeB 404 base station, the network resource controller 512 may be configured to utilize its DL radio resource assignment component 516 to generate and/or issue various DL radio resource assignments (e.g., carrier DL RB grants) to one or more UEs located within its corresponding network cells (e.g., within LTE-A PCC cell 210 and/or SCC cells 212 and 214). Further, the network resource controller 512 may also be configured to utilize its UL radio resource assignment component 514 to generate and/or issue various UL radio resource assignments (e.g., carrier UL RB grants) to one or more UEs located within its corresponding network cells (e.g., within LTE-A PCC cell 210 and SCC cells 212 and 214). The network resource controller 512 of the network apparatus 500 may be able to employ its DL/UL HARQ scheduler component 520 to determine which UEs 106 should receive various control-plane data HARQ retransmissions, and on what RBs these HARQ retransmissions should be communicated during a respective TTI, in the DL or in the UL.

In various configurations, the processing circuitry 502 of the network apparatus 500 may be configured to perform various control-plane signaling activities, including control-plane data transmissions and HARQ retransmissions, e.g., by executing instructions of its control-plane signaling component 514 and its DL/UL HARQ scheduler 520, in accordance with one or more embodiments disclosed herein. In this regard, the processing circuitry 502 can be configured to perform and/or control performance of one or more functionalities of the network apparatus 500 in accordance with various implementations, and thus can provide functionality for performing control-plane signaling operations in the DL or in the UL, along with other communication procedures of the network apparatus 500, in accordance with various embodiments. The processing circuitry 502 may further be configured to perform data processing, application execution, and/or other control and management functions according to one or more embodiments of the disclosure.

The network apparatus 500, or portions or components thereof, such as the processing circuitry 502, can include one or more chipsets, which can respectively include any number of coupled microchips thereon. The processing circuitry 502 and/or one or more other components of the network apparatus 500 may also be configured to implement functions associated with various selective HARQ retransmissions of control-plane data and dynamic HARQ retransmissions of control-plane data using multiple chipsets. In some scenarios, the network apparatus 500 may be associated with, or employed as, a MME 108a-c or an eNodeB base station of one or more LTE-A cells 104a-b, to operate within the wireless communication system 100 of FIG. 1, or alternatively within the wireless communication network 200 of FIG. 2. In this implementation, the network apparatus 500 may include one or more chipsets configured to enable the network apparatus 500 to operate within an LTE network employing carrier aggregation, as a network entity, or as joint network entities, capable of providing LTE-A communications service to any number of UEs 106 located within its corresponding wireless coverage area(s) (e.g., coverage areas associated with a PCC 210 and one or more SCCs, 212 and 214, of FIG. 2).

In some scenarios, the processing circuitry 502 of the network apparatus 500 may include one or more processor(s) 504 and a memory component 506. The processing circuitry 502 may be in communication with, or otherwise coupled to, a radio frequency (RF) circuit 508 having an LTE-A compliant modem and one or more wireless communication transceivers 510. In various implementations, the RF circuit 508 including the LTE-A compliant modem and transceiver(s) 510 may be configured to communicate using different LTE RAT types.

In various implementations, the processor(s) 504 may be configured and/or employed in a variety of different forms. For example, the processor(s) 504 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 504 can be coupled to and/or configured in operative communication with each other and these components may be collectively configured to perform one or more procedures of the network apparatus 500 as described herein in the form of an eNodeB base station having RRC control functionality and/or in the form of a MME having NAS signaling functionality.

In some scenarios, the processor(s) 504 of the processing circuitry 502 can be configured to execute instructions that may be stored in the memory 506 or that can be otherwise accessible to the processor(s) 504 within some other device memory type. As such, whether configured as, or in conjunction with, hardware or a combination of hardware and software, the processor(s) 504 of the processing circuitry 502 may be capable of performing operations according to various implementations described herein, when configured accordingly.

In various embodiments, the memory 506 of the processing circuitry 502 may include multiple memory devices that can be associated with any common volatile or non-volatile memory type. In some scenarios, the memory 506 may be associated with a non-transitory computer-readable storage medium that can store various computer program instructions, which may be executed by the processor(s) 504 during normal program executions. In this regard, the memory 506 can be configured to store information, data, applications, instructions, or the like, for enabling the network apparatus 500 to carry out various control-plane data signaling and HARQ retransmission functions, in accordance with one or more embodiments of the disclosure. In some implementations, the memory 506 may be actively in communication with and/or coupled to the processor(s) 504 of the processing circuitry 502, as well as one or more system buses for passing information between and amongst the different device components of the network apparatus 500.

It should be appreciated that not all of the components, device elements, and hardware illustrated in and described with respect to the network apparatus 500 of FIG. 5 may be essential to this disclosure, and thus, some of these items may be omitted, consolidated, or otherwise modified within reason. Additionally, in some implementations, the subject matter associated with the network apparatus 500 can be configured to include additional or substitute components, device elements, or hardware, beyond those that are shown within the illustrations of FIG. 5.

Figure 6:
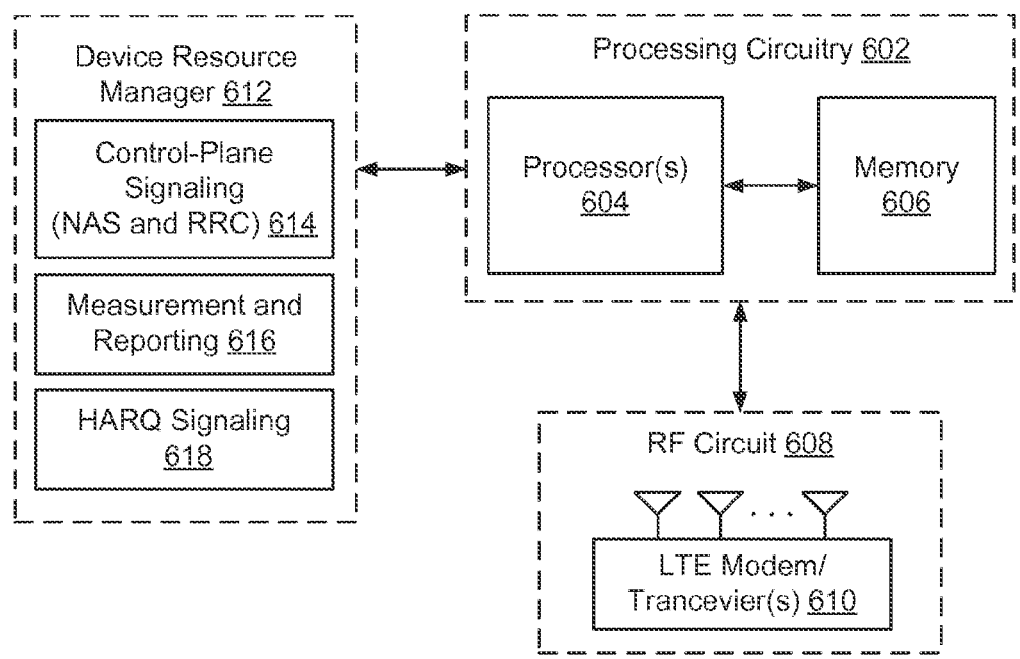
FIG. 6 shows a block diagram of a wireless communication device including a device resource manager having a control-plane signaling component, a measurement and reporting component, and a HARQ signaling component, in accordance with some implementations of the disclosure.

FIG. 6 shows a block diagram of a wireless communication device 600 (e.g., an LTE-A compliant UE) including a device resource manager 612 having a control-plane signaling component 614, a measurement and reporting component 616, and a HARQ signaling component 618, as well as, processing circuitry 602 having one or more processor(s) 604 and a memory 606, and an RF circuit 608 having an LTE modem 610 and one or more transceiver(s). In various configurations, the wireless communication device 600 can employ its control-plane signaling component 614 of its device resource manager 612 to perform both NAS and RRC signaling operations while in communication with an MME and/or and eNodeB base station.

Further, the wireless communication device 600 may employ its measurement and reporting component 616 of its device resource manager 612 to measure various radio frequency (RF) conditions, e.g., a reference signal received power (RSRP), a received signal strength indication (RSSI), a signal to interference plus noise ratio (SINR), etc., associated with any number of serving cells (e.g., for any of the PCC 210 and SCC, 212 and 214, cells of FIG. 2), at any particular time, and then transmit these measured RF conditions within a corresponding measurement report (MR), e.g., as one or more of a channel quality indicator (CQI), a pre-coding matrix indicator (PMI), a rank indicator (RI), etc., within one or more periodic or aperiodic (network trigger-initiated) MR(s). Additionally, the wireless communication device 600 may employ its HARQ signaling component 618 of its device resource manager 612 to perform various HARQ signaling functions (e.g., ACK/NACK messaging, UL re/transmissions, etc.), in accordance with various embodiments that are described further herein.

The processing circuitry 602 can be configured to perform and/or control performance of one or more functionalities of the wireless communication device 600 in accordance with various implementations, and thus, the processing circuitry 602 can provide functionality for performing various control-plane signaling activities, including control-plane data transmissions (e.g., NAS or RRC signaling) and HARQ retransmissions of control-plane data, e.g., by executing instructions of its control-plane signaling component 614 and its HARQ signaling component 618, in accordance with one or more embodiments. In this regard, the processing circuitry 602 can be configured to perform and/or control performance of one or more functionalities of the wireless communication device 600 in accordance with various implementations, and thus can provide functionality for performing control-plane communications in the DL or in the UL, along with other communication procedures, in accordance with various embodiments. The processing circuitry 602 may further be configured to perform data processing, application execution, and/or other device functions according to one or more embodiments of the disclosure.

The wireless communication device 600, or portions or components thereof, such as the processing circuitry 602, can include one or more chipsets, which can respectively include any number of coupled microchips thereon. The processing circuitry 602 and/or one or more other components of the wireless communication device 600 may also be configured to implement functions associated with various control-plane signaling procedures of the disclosure using multiple chipsets. In some scenarios, the wireless communication device 600 may be associated with, or employed as, an LTE-A compliant UE 106 having multiple transceivers.

In various scenarios, the processing circuitry 602 of the wireless communication device 600 may include one or more processor(s) 604 and a memory component 606. The processing circuitry 602 may be in communication with, or otherwise coupled to, its radio RF circuit 608 having an LTE compliant modem and one or more wireless communication transceivers 610. In some implementations, the RF circuit 608 including the modem and the one or more transceivers 610 may be configured to communicate using different RAT types. For instance, in some embodiments the RF circuit 608 may be configured to communicate using various RATs, including one or more LTE-A RATs.

In some embodiments, the processor(s) 604 may be configured in a variety of different forms. For example, the processor(s) 604 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 604 of the wireless communication device 600 can be coupled to and/or configured in operative communication with each other, and these components may be collectively configured to perform one or more control-plane signaling and/or HARQ retransmission procedures as described further herein.

In some implementations, the processor(s) 604 can be configured to execute instructions that may be stored in the memory 606, or that can otherwise be accessible to the processor(s) 604 in some other device memory. As such, whether configured as, or in conjunction with, hardware or a combination of hardware and software, the processor(s) 604 of the processing circuitry 602 may be capable of performing operations according to various implementations described herein, when configured accordingly.

In various embodiments, the memory 606 of the processing circuitry 602 may include multiple memory devices that can be associated with any common volatile or non-volatile memory type. In some scenarios, the memory 606 may be associated with a non-transitory computer-readable storage medium that can store various computer program instructions which may be executed by the processor(s) 604 during normal program executions. In this regard, the memory 606 can be configured to store information, data, applications, instructions, or the like, for enabling the wireless communication device 600 to carry out various functions in accordance with one or more embodiments of the disclosure. In some implementations, the memory 606 may be in communication with, and/or otherwise coupled to, the processor(s) 604 of the processing circuitry 602, as well as one or more system buses for passing information between and amongst the different device components of the wireless communication device 600.

It should be appreciated that not all of the components, device elements, and hardware illustrated in and described with respect to the wireless communication device 600 of FIG. 6 may be essential to this disclosure, and thus, some of these items may be omitted, consolidated, or otherwise modified within reason. Additionally, in some implementations, the subject matter associated with the wireless communication device 600 can be configured to include additional or substitute components, device elements, or hardware, beyond those depicted within the illustrations of FIG. 6.

Figure 7A:
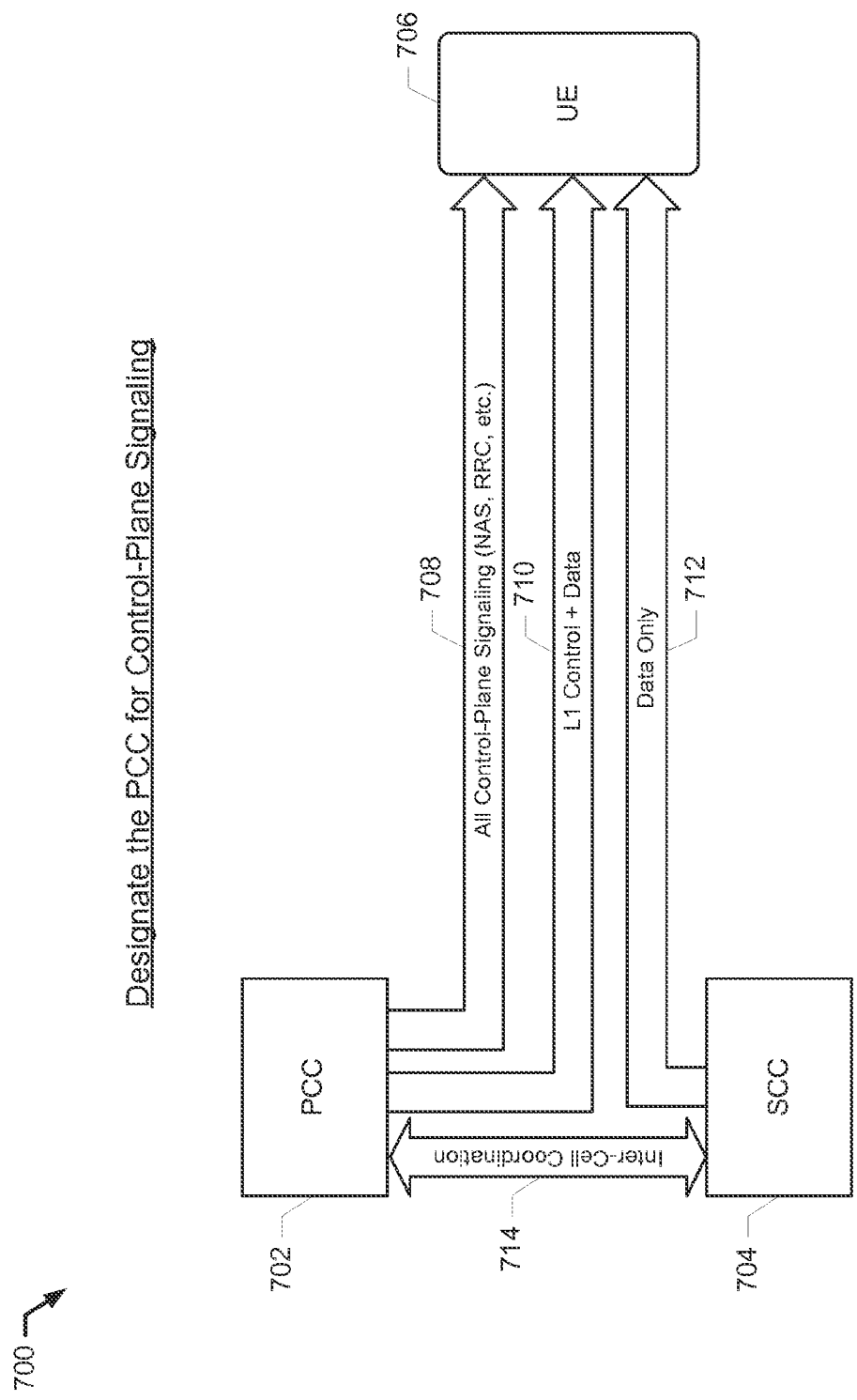
FIG. 7A shows a block diagram depicting a carrier aggregation scenario where a PCC is designated as a default network resource for conducting various control-plane data communications with a UE, in accordance with some embodiments.

FIG. 7A shows a block diagram depicting a carrier aggregation scenario 700 where a PCC 702 can be designated as a default network entity/resource for communicating control-plane data (e.g., for NAS and RCC signaling) with a UE 706, in accordance with some embodiments of the disclosure. In various implementations, the UE 706 may be an LTE-A compliant mobile device (e.g., representative of the wireless communication device 600 of FIG. 6) that can communicate with one or more eNodeB base station(s), via the LTE-Uu interface, that may provide the UE 706 with wireless communications service via a PCC 702 and a SCC 704, by employing LTE-A carrier aggregation RATs.

In an embodiment, all Level 1 (L1) PHY layer control data transmissions 710 may be designated for the PCC 702 by default, and the PCC 702 may additionally communicate other IP packet data with the UE 706 in the DL or in the UL via the LTE-Uu interface. However, the SCC 704 may only communicate IP packet data 712, without L1 control data, with the UE 706 in the DL or in the UL, via the LTE-Uu Interface. The SCC 704 can coordinate its packet data transmissions (including control-plane data communications) with the PCC 702 via an inter-cell coordination link 714, via the LTE-X2 interface, to maximize communications throughput.

However, in certain situations, when time-sensitive control-plane data (e.g., NAS and RRC signaling) is communicated within packet data transmissions from the PCC 702 to the UE 706, and from the SCC 704 to the UE 706, independently, negative outcomes may result. By way of example, when communications between the SCC 704 and the UE 706 are deemed by the network to be volatile, such as when RF conditions are poor and communications degrade to the point where a RLF could result on the communication link 712 between the SCC 704 and the UE 706, it may be disadvantageous for the network to designate any control-plane data communications for the SCC 704. In this scenario, it is assumed that the PCC 702 will typically have a stronger communication link 710 with the UE 706, as compared to a communication link 712 between the SCC 704 and the UE 706.

Accordingly, it may be particularly beneficial for the network to pre-designate all control-plane data communications for the PCC 702, as opposed to the SCC 704, such that these time-sensitive control-plane communications are only scheduled to occur via a more reliable communications link 708 between the PCC 702 and the UE 706. In various embodiments, this designation may be implemented by the network in an effort to prevent time-sensitive control-plane data from being lost in predicable scenarios where a communication link between the SCC 704 and the UE 706 may fail. This will improve the likelihood of the UE 706 timely receiving sensitive control-plane data from the network via the most reliable communication link 708 available, between PCC 702 and the UE 706.

Figure 7B:
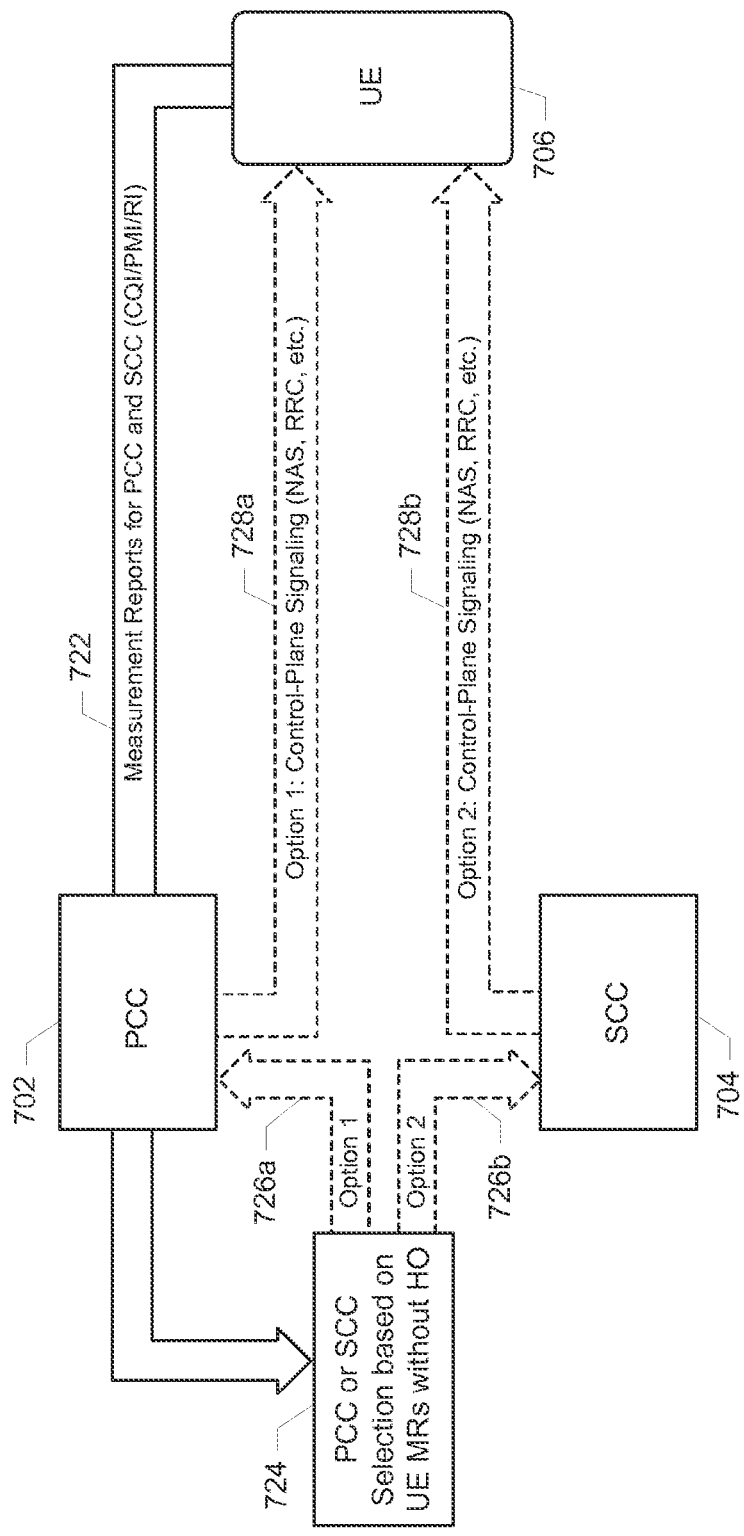
FIG. 7B shows a block diagram depicting a carrier aggregation scenario where control-plane data communications with a UE are dynamically allocated to either a PCC or to a preferred SCC based on various radio frequency condition evaluations, in accordance with various implementations of the disclosure.

FIG. 7B shows a block diagram, similar to that of FIG. 7a, depicting another carrier aggregation scenario 720 where control-plane data (e.g., NAS and RCC information) communications for a UE 706 can be dynamically allocated to either the PCC 702 or to a preferred SCC 704, based on various RF condition evaluations (e.g., RF conditions that can be received by the PCC 702 within one or more periodic or aperiodic MRs) performed by a network entity (e.g., at an MME and/or an eNodeB base station), in accordance with some embodiments of the disclosure. In various scenarios, the UE 706 may be an LTE-A compliant communication device (e.g., representative of the wireless communication device 600 of FIG. 6) that can communicate with one or more eNodeB base station(s), via the LTE-Uu interface, that may provide the UE 706 with wireless communications service via a PCC 702 and a SCC 704, by employing LTE-A carrier aggregation RATs.

In some embodiments, various network conditions associated with both a communications link between the PCC 702 and the UE 706, and a communications link between the SCC 704 and the UE 706, may be evaluated by a network entity associated with at least the PCC 702 (e.g., an MME and/or an eNodeB base station) to determine which of the two carrier cells, the PCC 702 or the SCC 704, should be designated for control-plane data communications.

For example, in some implementations, the PCC 702 (or a network entity associated therewith) may receive either periodic or aperiodic (network trigger-initiated) MRs 722 that can include CQI, PMI, and/or RI information relating to both RF conditions for the communications link between the PCC 702 and the UE 706, and RF conditions for the communications link between the SCC 704 and the UE 706. In other embodiments, the PCC 702 (or a network entity associated therewith) may already be aware of the RF conditions for these respective communications links based on historical RF condition information stored by the network, e.g., at a network entity, such as an MME or an eNodeB base station.

In some embodiments, a network entity associated with the PCC 702 (e.g., an eNodeB base station) may evaluate respective RF conditions 724 (received in MRs or maintained within a network entity) associated with the PCC 702 and the SCC 704. In various scenarios, this may be accomplished by comparing one or more common RF metrics of the LTE-A communication standard, to determine whether to dynamically designate the PCC 702 or a SCC 704 as the preferred carrier cell "option" for performing all subsequent control-plane signaling operations and communications with the UE 706 after a particular time, or during a network-selected time interval.

In one implementation, a network entity associated with the PCC 702 can select a first option 726a, based on comparing various RF conditions associated with one or more RF condition evaluations 724, by instructing the PCC 702 to handle all control-plane signaling operations via a radio link 728a between the PCC 702 and the UE 706. This may occur when the radio link 728a between the PCC 702 and the UE 706 is determined to be better than a radio link 728b between the SCC 704 and the UE 706. Alternatively, in another implementation, a network entity associated with the PCC 702 or the SCC 704 can select a second option 726b, based on comparing various RF conditions associated with one or more radio link evaluations 724, by instructing the SCC 704 to handle all control-plane signaling operations via a radio link 728b between the SCC 704 and the UE 706. This may occur when the radio link 728b between the SCC 704 and the UE 706 is determined to be better than a radio link 728a between the PCC 702 and the UE 706. It should be understood that in various configurations, these control-plane signaling allocations for the PCC 702 or the SCC 704, may be dynamically assigned for pre-determined periods of time or for indefinite periods of time that may be changed in real-time with the advent of various network condition triggers (e.g., in response to one or more MR trigger events).

Figure 8:
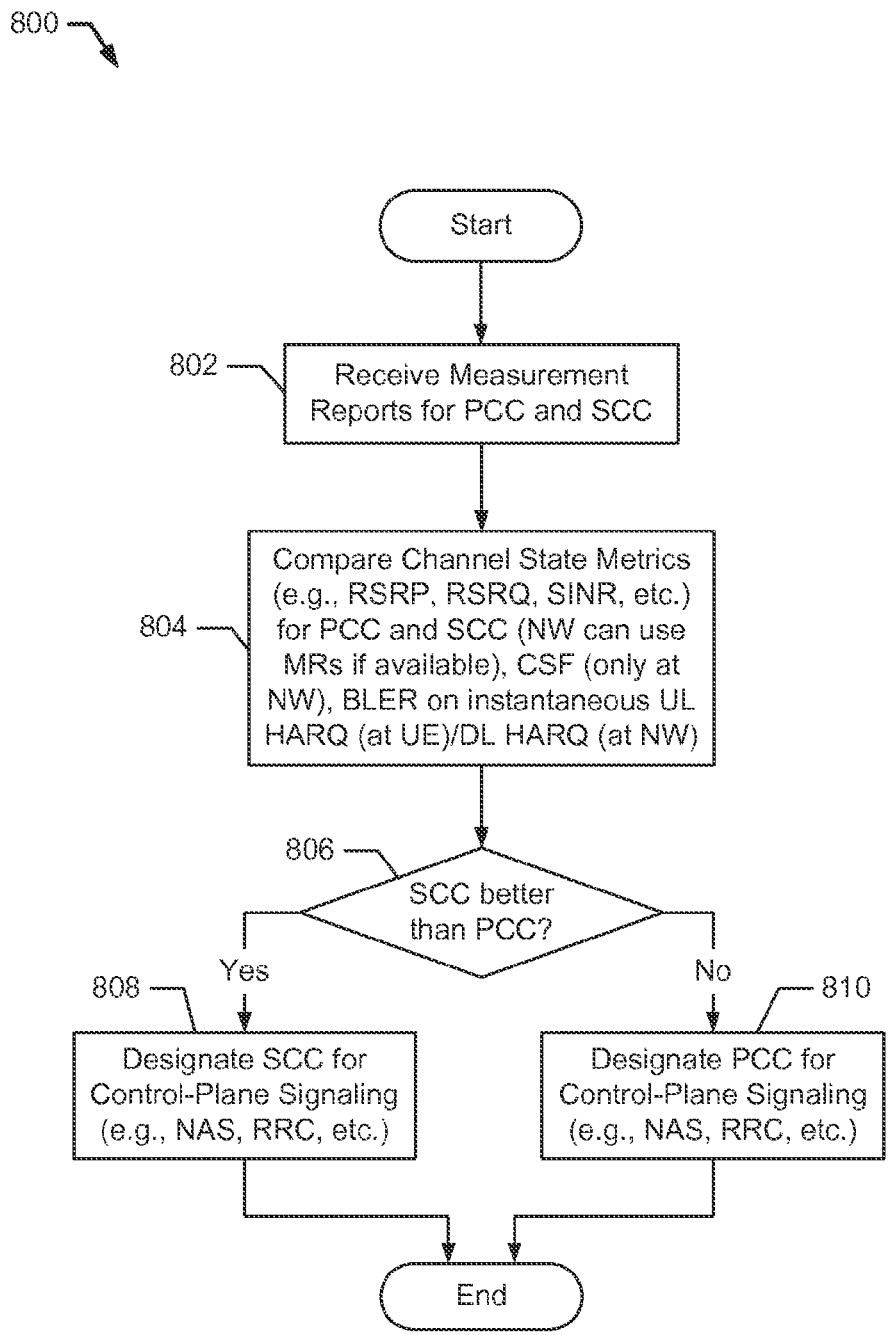
FIG. 8 shows a flowchart depicting a procedure for dynamically designating a PCC or a SCC for conducting control-plane data communications, in accordance with some embodiments of the disclosure.

FIG. 8 shows a flowchart depicting a procedure 800 for dynamically designating a PCC 702 or a SCC 704 for conducting control-plane data communications with a UE 706, in accordance with some embodiments of the disclosure. In this regard, it should be understood that any or all of the procedures 800 depicted in FIG. 8 may be associated with a method, or methods, that can be implemented by the execution of computer program instructions stored in a non-transitory computer-readable memory 506 of the network apparatus 500, and optionally, in conjunction with the execution of computer program instructions stored in a non-transitory computer-readable memory 606 of a wireless communication device 600.

Initially, at operation block 802, a network apparatus 500 (e.g., an MME and/or an eNodeB base station) associated with a PCC 702 and/or a SCC 704, may receive one or more periodic or aperiodic (network event-triggered) MRs from a particular wireless communication device 600 (e.g., the UE 706 of FIGS. 7a-b). Then, at operation block 804, the network apparatus 500 and/or the wireless communication device 600 (or another network entity associated therewith) may compare various RF channel metrics (e.g., RSRP, RSRQ, SINR, etc.) associated with both a communication link between a PCC 702 and the UE 706, and a communication link between a SCC 704 and the UE 706, to determine which of the two cells provides the most reliable RF conditions for subsequent control-plane data communications with the UE 706.

In certain scenarios, the network can utilize information from one or more MRs, if and when they become available, e.g., when they are transferred to the network apparatus 500 from the wireless commutation device 600 via the measurement and reporting component 616, to make its determination of a preferred cell for handling control-plane signaling communications. Alternatively, circuit-switched fallback (CSF) conditions (at the network apparatus 500), block error rate (BLER) information for instantaneous UL HARQ (at the UE 600) or for DL HARQ (at the network apparatus 500) may also be evaluated to determine which of the two cells provides the most reliable and predictable RF conditions for subsequent control-plane data communications with the UE 706. At decision block 806, a determination is made as to whether the PCC 702 or the SCC 704 is the preferred carrier cell for subsequent control-plane data communications with the UE 706.

In a scenario where the PCC 702 is determined to be the preferred carrier cell for control-plane data communications, at operation block 810, the PCC 702 can be designated by the network (e.g., at an MME and/or an eNodeB base station) for handling future control-plane data signaling operations and communications (e.g., for NAS and RRC messaging). Alternatively, in a scenario where the SCC 704 is determined to be the preferred carrier cell for control-plane data communications, at operation block 818, the SCC 704 may be designated by the network (e.g., at an MME and/or an eNodeB base station) for handling future control-plane data signaling operations and communications (e.g., for NAS and RRC messaging).

Figure 9:
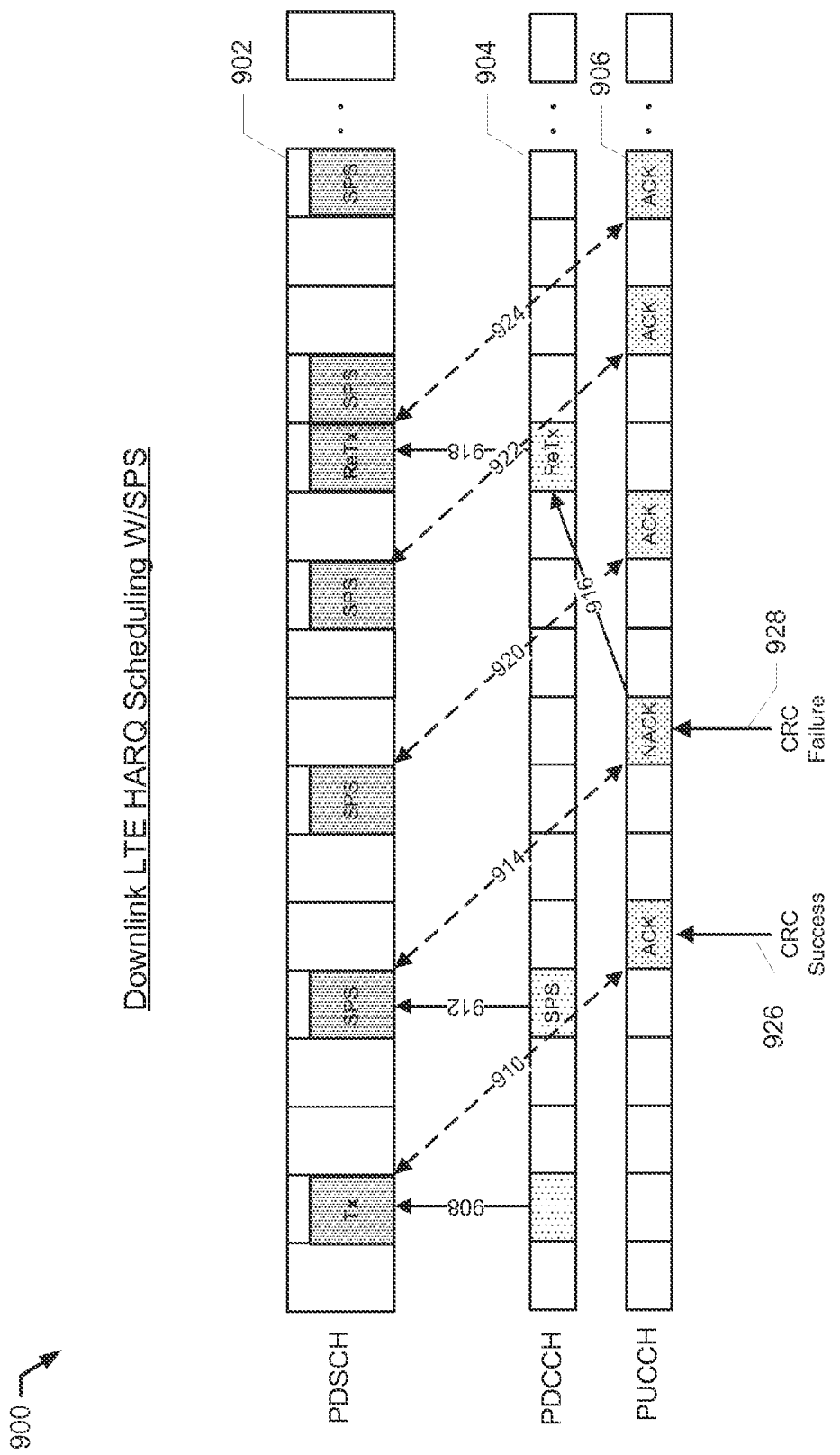
FIG. 9 shows a block diagram depicting DL HARQ scheduling with semi-persistent scheduling (SPS) procedures for LTE communications, in accordance with some implementations.

FIG. 9 shows a block diagram depicting DL HARQ scheduling with semi-persistent scheduling (SPS) procedures 900 for LTE communications, in accordance with some implementations. In general, LTE HARQ processes can attempt to retransmit failed TB communications that may include control-plane data in the DL and/or in the UL. The DL HARQ scheduling procedures 900 depict signaling interactions between the physical downlink shared channel (PDSCH) 902, the physical downlink control channel (PDCCH) 904, and the physical uplink control channel (PUCCH) 906, during various DL HARQ processes.

As would be understood by those skilled in the art, the PDCCH 904 may include downlink control information (DCI), e.g., emanating from an eNodeB, that informs a UE 600 of various DL resource allocations for the PDSCH 902, HARQ information relating to the PDSCH 902, various UL scheduling grants for the physical uplink shared channel (PUSCH) 1002, etc. The PUCCH 906 can carry DL HARQ acknowledgements (e.g., ACK/NACKs) that are transmitted by a UE 600 to a network apparatus 500 in response to the UE 600 receiving, or not receiving, various DL data transmissions via the PDSCH 902.

In some situations, a DL allocation 908 may be transmitted from a network apparatus 500 having DL HARQ scheduler 520 (e.g., an eNodeB having RRC functionality) within the PDCCH 904 to a UE 600 to identify a particular set of designated DL resource blocks (RBs) where the UE 600 should attempt to decode the PDSCH 902 for DL information that may include control-plane data. Upon acquiring, or attempting to acquire, the identified DL information that may include control-plane data from the PDSCH 902 corresponding to the DL allocation 908, an intended recipient UE 600 can send a positive DL HARQ acknowledgement (ACK) message 910 or a negative DL HARQ acknowledgement (NACK) message 914 to the network apparatus 500 via the PUCCH 906.

The DL HARQ ACK/NACK acknowledgements can indicate to the network apparatus 500 (e.g., an eNodeB having RRC functionality) whether or not the DL information was received or acquired by the UE 600 and/or whether DL information that was acquired by the UE 600 is free from errors, e.g., according to a cyclic redundancy check (CRC) result. In some scenarios, a DL CRC success result 926 can indicate that DL information was acquired by a UE 600 with or without error. Alternatively, a DL CRC failure result 928 may indicate that scheduled, expected DL information was not acquired by a UE 600. As would be understood by those skilled in the art, a UE 600 will typically issue a DL HARQ ACK message to a network apparatus 500 (e.g., an eNodeB) via the PUCCH 906 in response to receiving a DL CRC success result 926. Likewise, a UE 600 will typically issue a DL HARQ NACK message to a network apparatus 500 (e.g., an eNodeB) in response to receiving a DL CRC failure result 928.

In accordance with the DL HARQ SPS example 900, an ongoing SPS DL resource allocation 912 may be sent by a network apparatus 500 employing the DL HARQ scheduler 520 (e.g., an eNodeB having RRC functionality) to a UE 600 to instruct the UE 600 to attempt to decode the PDSCH 902 for known, recurring DL information on a periodic basis (e.g., every 10 TTIs), such that the UE 600 is not required to further decode the PDCCH 904 until a change to the ongoing SPS allocation 912 is detected. Accordingly, at every designated SPS interval (e.g., every 10 ms.) a UE 600 can attempt to decode the PDSCH 902 for prescheduled DL information. Depending on whether or not the DL information has been successfully acquired by the UE 600 via the PDSCH 902 and/or whether or not the DL information was acquired without errors, the UE 600 can send a DL HARQ ACK message 910, 920, 922, and 924, or a DL HARQ NACK message 914 to the network apparatus 500 (e.g., an eNodeB) via the PUCCH 906.

In various implementations, upon receiving a DL HARQ NACK 914 message via the PUCCH 906 that indicates a DL transmission failure or error (e.g., corresponding to a CRC failure result 928), a network apparatus 500 employing the DL HARQ scheduler 520 (e.g., an eNodeB having RRC functionality) can attempt to retransmit the DL information and/or a portion of the DL information 916 that may include control-plane data to the UE 600 at a later time, in accordance with a designated retransmission interval/duration (e.g., 4 TTIs later=4 ms.). In various scenarios, a total retransmission time or round trip time (RTT) for the UE 600 to receive the correct and/or complete DL information may be scheduled to occur within a particular number of TTIs to account for anticipated network communication and device processing delays (e.g., a DL RTT of 8 TTIs=8 ms.).

In some scenarios, a network apparatus 500 employing the DL HARQ scheduler 520 can evaluate a DL HARQ NACK 914 received via the PUCCH 906 to determine when to schedule a DL retransmission 916 based on various network considerations, including an application data type being communicated in the DL. The UE 600 can thereafter be informed of the DL retransmission schedule 916 by receiving a supplemental DL allocation 918 for the retransmission within the PDCCH 904, as designated by the network apparatus 500 (e.g., an eNodeB having RRC functionality). As would be understood by those skilled in the art, this DL HARQ retransmission can occur on top of ongoing SPS operations, such that the DL HARQ procedures 900 requiring the UE 600 to decode the PDCCH 904 for retransmit control information will supersede SPS PDCCH "do not decode" durations.

Figure 10:
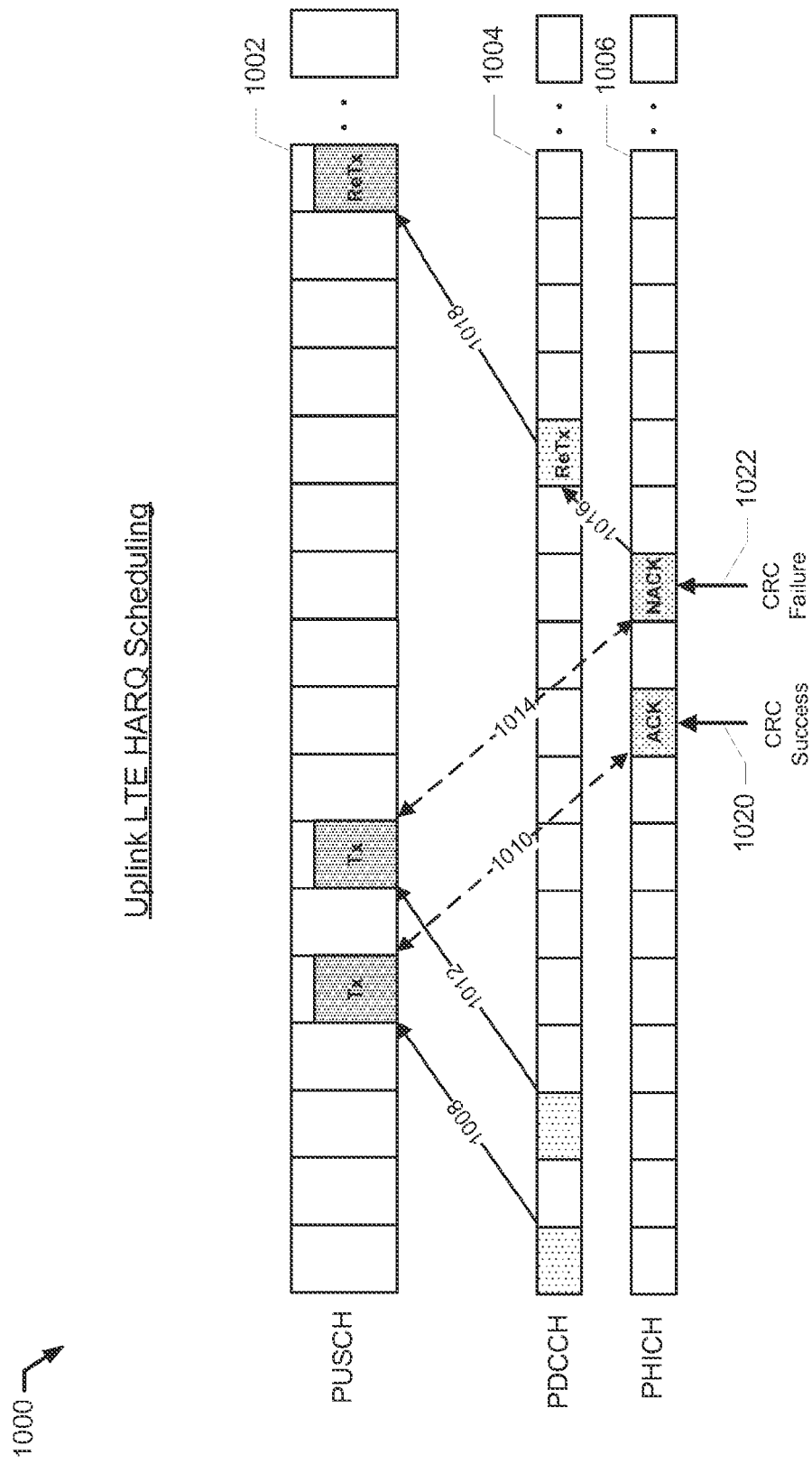
FIG. 10 shows a block diagram depicting UL HARQ scheduling procedures for LTE communications, in accordance with other embodiments of the disclosure.

FIG. 10 shows a block diagram depicting UL HARQ scheduling procedures 1000 for LTE communications, in accordance with other embodiments of the disclosure. Although not depicted in FIG. 10, it should be understood that in some implementations UL HARQ processes 1000 can occur in conjunction with SPS and/or C-DRX power saving routines. The UL HARQ scheduling procedures 1000 depict signaling interactions between the PUSCH 1002, the PDCCH 1004, and the physical hybrid-ARQ indicator channel (PHICH) 1006, during various UL HARQ processes. As would be understood by those skilled in the art, the PHICH 1006 is configured to carry UL HARQ acknowledgements (e.g., ACK/NACKs) that can be transmitted by a network apparatus 500 (e.g., an eNodeB) in response to receiving, or not receiving, various expected UL data transmissions from a UE 600 that it provides LTE communications services to.

In some embodiments, an UL grant 1008 may be transmitted from a network apparatus 500 employing an UL HARQ scheduler 520 (e.g., an eNodeB having RRC functionality) within the PDCCH 1004 to a UE 600 to identify a particular set of designated UL RBs where the UE 600 should attempt to transmit UL information to the network apparatus 500 in accordance with a predefined TTI interval (e.g., every 4 TTIs=4 ms.). In this configuration, there will be a TTI delay between a time when the UE 600 receives the UL grant 1008 via the PDCCH 1004 and a time when the UL RBs allocated to UE 600 for the UL transmission become available. The TTI delay is intended to give the UE 600 sufficient time to process the UL data and determine how best to transmit a corresponding UL TB, e.g., in accordance with various network-designated quality of service (QoS) requirements.

Upon receiving, or attempting to receive, an UL transmission that may include control-plane data via the PUSCH 1002, corresponding to an UL grant, 1008 or 1012, a recipient network apparatus 500 (e.g., an eNodeB) can transmit either a positive UL HARQ acknowledgement (ACK) message 1010 or a negative UL HARQ acknowledgement (NACK) message 1014 to the sending UE 600 via the PHICH 1006, e.g., on the DL from the network apparatus 500. The UL HARQ ACK/NACK acknowledgements, 1010 and 1014, can indicate to the UE 600 whether or not an UL TB was received or acquired by the network apparatus 500 and/or whether information of the UL TB that was acquired by the network apparatus 500 is free from errors, e.g., according to a corresponding cyclic redundancy check (CRC) result, 1020 or 1022. In various embodiments, an UL CRC success result 1020 can indicate that the UL TB was received by the network apparatus 500 without error. Alternatively, an UL CRC failure result 1022 may indicate that the UL TB was erroneously received by the network apparatus 500.

As would be understood by those skilled in the art, a network apparatus 500 (e.g., an eNodeB having RRC functionality) will typically issue an UL HARQ ACK message to a corresponding UE 600 via the PHICH 1006 in response to an UL CRC success result 1020. Similarly, a network apparatus 500 (e.g., an eNodeB having RRC functionality) will typically issue an UL HARQ NACK message to a UE 600 via the PHICH 1006 in response to an UL CRC failure result 1022.

In some implementations, upon receiving an UL HARQ NACK 1014 via the PHICH 1006 from a network apparatus 500 that indicates an UL transmission failure or error (e.g., corresponding to an UL CRC failure result 1022), a UE 600 can attempt to retransmit the UL TB and/or a portion of the UL TB information 1016 that may include control-plane data to the network apparatus 500 at a later time, in accordance with a designated retransmission interval (e.g., within 4 TTIs=4 ms.). In various scenarios, a total retransmission time or round trip time (RTT) for the network apparatus 500 to receive the correct and/or complete UL TB from the UE 600 may be scheduled to occur within a designated number of TTIs associated with an UL HARQ RTT to account for anticipated network communication and device processing delays (e.g., an UL RTT of 8 TTIs=8 ms.).

Figure 11:
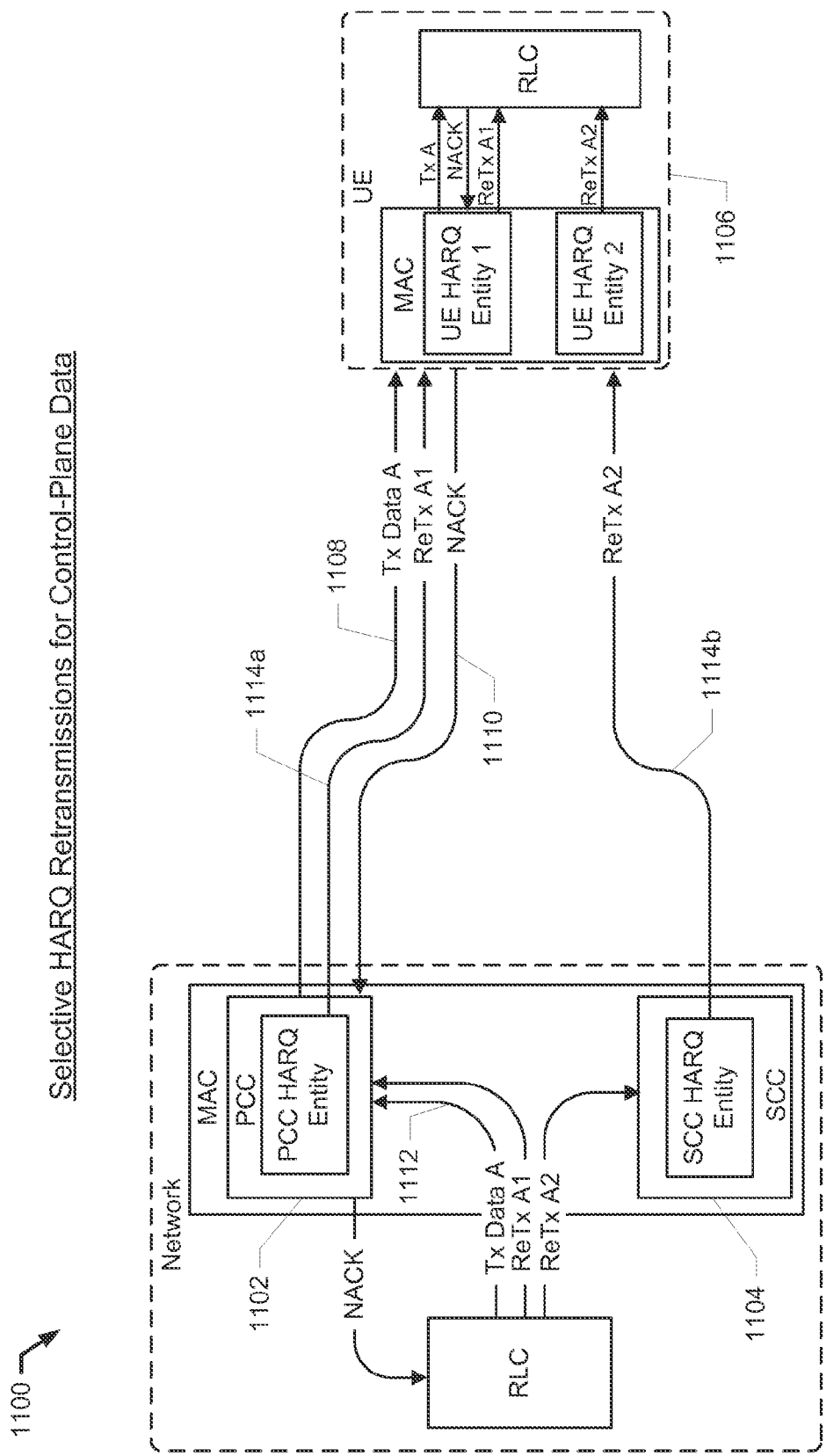
FIG. 11 shows a block diagram depicting a selective HARQ retransmission of control-plane data between multiple network entities (e.g., a PCC and a SCC) and a UE in a carrier aggregation scenario, in accordance with various implementations.

FIG. 11 shows a block diagram depicting a selective retransmission 1100 of control-plane data (e.g., NAS or RRC signaling data), emanating from a network RLC layer, between multiple network entities (e.g., a PCC 1102 and a SCC 1104) and a UE 1106 in a carrier aggregation scenario. It should be understood that, in various embodiments, a retransmission 1100 may occur in either the DL, between the PCC 1102, the SCC 1104, and the UE 1106, or in the UL between the UE 1106 and the PCC 1102 or the SCC 1104.

In accordance with some scenarios, the PCC 1102 may transmit Tx Data A 1108 to the UE 1106 via a first communication link, and the Tx Data A can include a first transmission of control-plane data (e.g., NAS or RRC information) to the UE in the DL from the RLC layer of the network.

In one scenario, the RLC layer associated with the UE 1106 may determine that the Tx Data A, with the initial control-plane data, was received in error. In response to this determination, the RLC layer of the UE 1106 can transmit a HARQ NACK message to the PCC's 1102 corresponding HARQ entity, which can then forward the NACK message to the RLC layer of network. In various implementations, the NACK message may include bitmap information that identifies the network resource allocation associated with Tx Data A.

The RLC layer of the network may use this NACK bitmap information to coordinate with the PCC's 1102 HARQ entity and/or the SCC's 1104 HARQ entity to schedule independent, duplicate retransmissions of control-plane Data A (ReTx Data A1 and ReTx Data A2) from both the PCC 1102 and the SCC 1104 to the UE 1106, e.g., via separate communication links 1114*a-b*, to ensure that the first control-plane data transmission is received by the UE 1106 in a timely and efficient manner via a corresponding RLC layer retransmission. Alternatively, in other embodiments, the network can identify a situation where an expected ACK corresponding to Tx Data A is not received from the UE 1106. In this scenario the RLC layer of the network can similarly coordinate with the PCC 1102 and the SCC 1104 to schedule independent, duplicate retransmissions of the first control-plane data.

Figure 12:
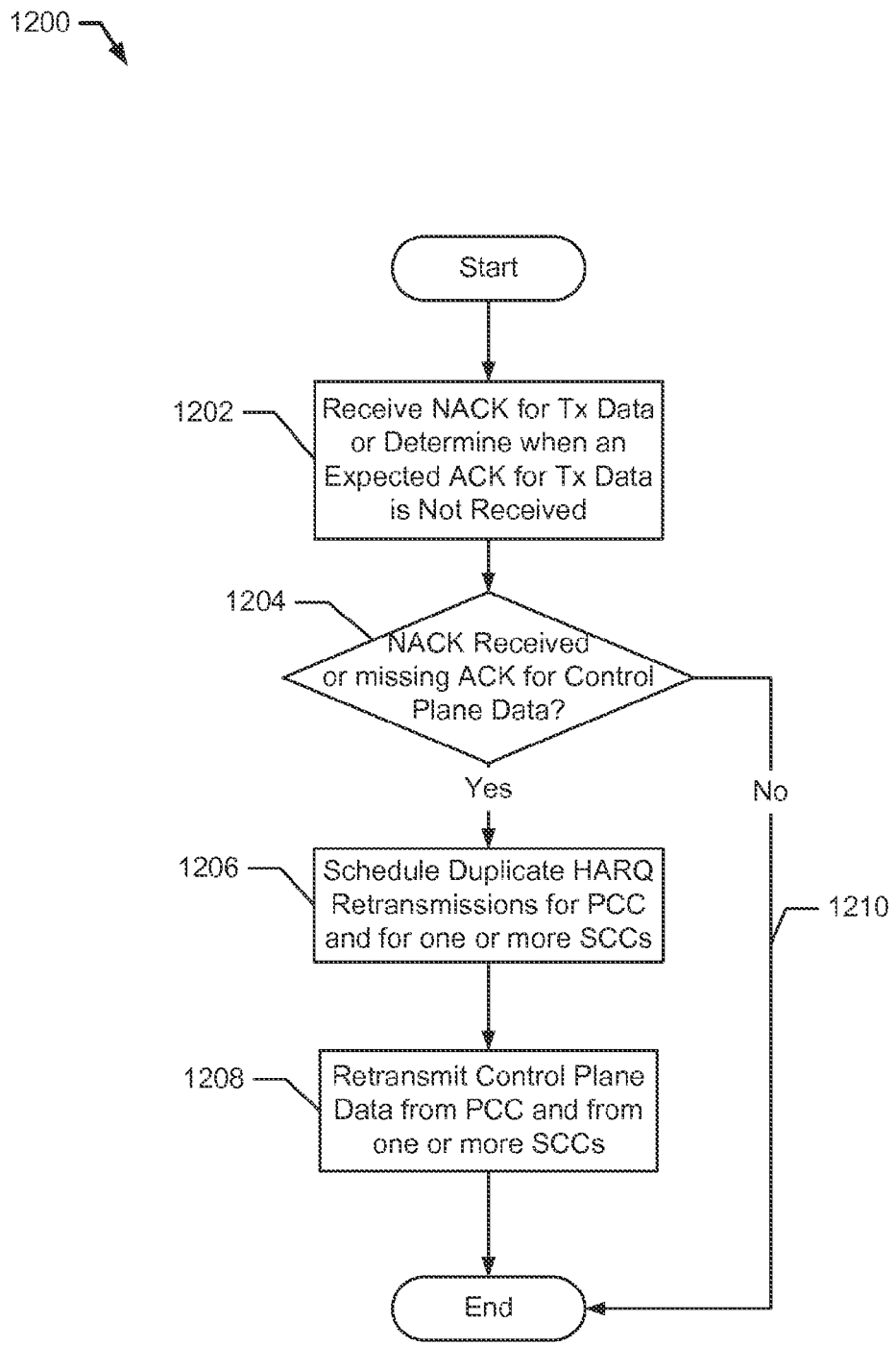
FIG. 12 shows a flowchart depicting a procedure for performing selective HARQ retransmissions of control-plane data, in accordance with some embodiments of the disclosure.

FIG. 12 shows a flowchart depicting a procedure 1200 for performing selective retransmissions of control-plane data (e.g., NAS and RRC control information) emanating from the RLC layer of a network, in accordance with some embodiments of the disclosure. In this regard, it should be understood that any or all of the procedures 1200 depicted in FIG. 12 may be associated with a method, or methods, that can be implemented by the execution of computer program instructions stored in a non-transitory computer-readable memory 506 of the network apparatus 500, and optionally, in conjunction with the execution of computer program instructions stored in a non-transitory computer-readable memory 606 of a wireless communication device 600.

Initially, at operation block 1202, a NACK for an initial control-plane data transmission may be received by a network apparatus 500 (e.g., an MME or an eNodeB base station) associated with a PCC 1102 or an SCC 1104. Alternatively, the network apparatus 500 may be able to identify a situation where an expected ACK corresponding to the initial control-plane data transmission is not received from the UE 1106. At decision block 1204, the network apparatus 500 may employ it RLC layer functions to determine whether a NACK response is received for the initial control-plane data transmission or whether a missing ACK scenario has occurred for the initial control-plane data transmission.

In a scenario where the network apparatus 500 receives an ACK response message for the initial control-plane data transmission 1210, the procedure 1200 ends as no retransmission is required. However, in a scenario where the network apparatus 500 receives a NACK response message for the initial control-plane data transmission, or alternatively, identifies a missing ACK scenario for the initial control-plane data transmission, the process proceeds to operation block 1206, where a duplicate HARQ retransmission for the initial control-plane data transmission is scheduled for the PCC 1102 and for one or more SCCs 1104. Next at operation block 1208, the initial control-plane data can be retransmitted to the UE 1106 from both the PCC 1102 and the one or more SCCs 1104, to ensure that the initial control-plane data is received by the UE 1106 in a timely manner.

Figure 13:
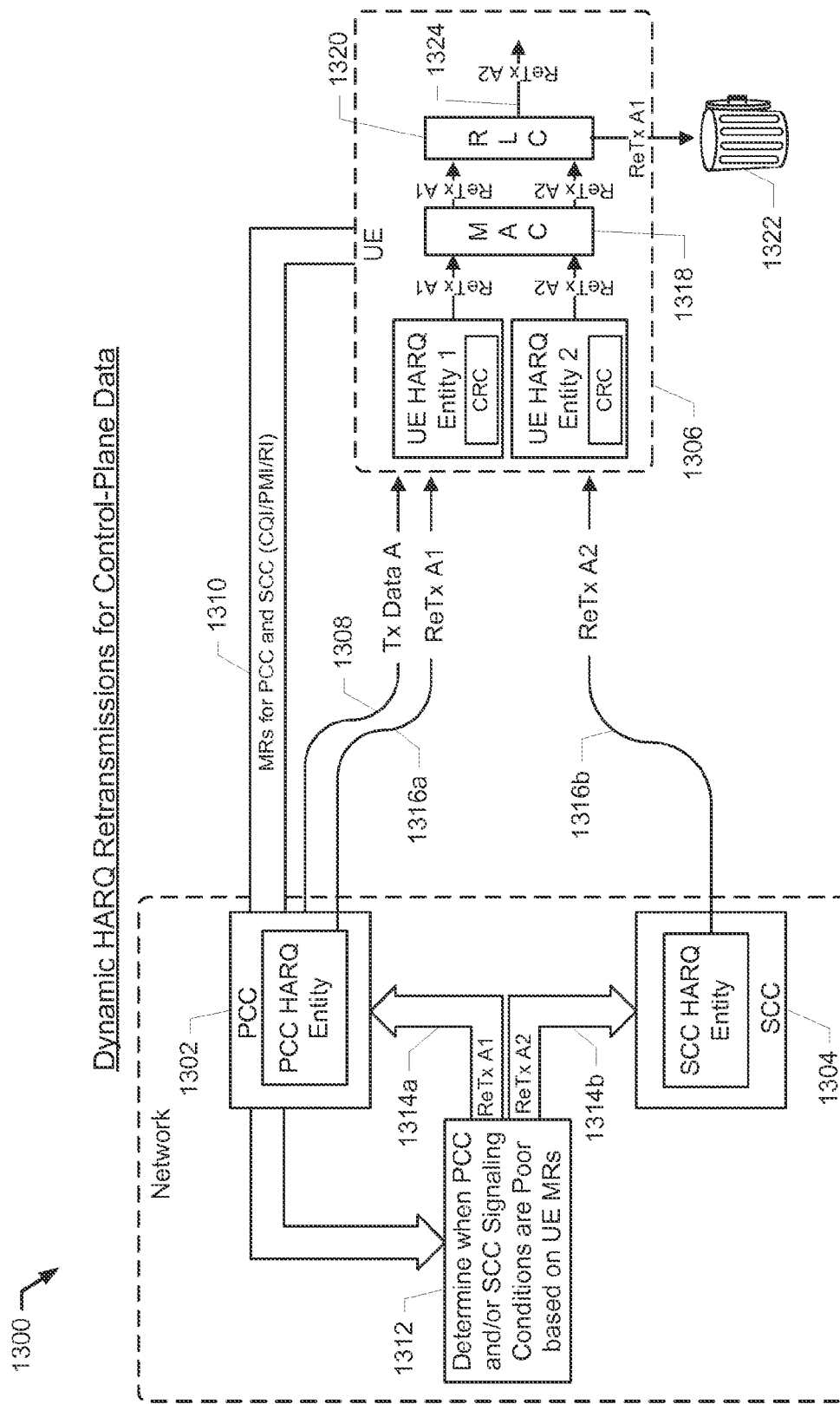
FIG. 13 shows a block diagram depicting a dynamic HARQ retransmission of control-plane data between multiple network entities (e.g., a PCC and a SCC) and a UE, in accordance with various embodiments.

FIG. 13 shows a block diagram depicting a dynamic HARQ retransmission 1300 of control-plane data (e.g., NAS and RRC control information) between multiple network entities (e.g., a PCC 1302 and a SCC 1304) and a UE 1306 in a carrier aggregation scenario, in accordance with various implementations. It should be understood that HARQ retransmission 1300 may occur in either the DL, between the HARQ entities of the PCC 1302 and the SCC 1304 and the respective HARQ entities of the UE 1306 (e.g., according to the DL HARQ retransmission 900 discussed above for FIG. 9), or in the UL between the first and second HARQ entities of the UE 1306 and the respective HARQ entities of the PCC 1302 and the SCC 1304 (e.g., according to the UL HARQ retransmission 1000 discussed above for FIG. 10).

In accordance with various embodiments, the UE 1306 may be configured to employ its measurement and reporting component 616 to transmit periodic or aperiodic (network event-triggered) MRs 1310 to a network entity 1312 (e.g., an MME and/or an eNodeB base station) associated with the PCC 1302 and/or the SCC 1304. Utilizing this information, the network entity 1312 may be able to determine when RF signaling conditions are poor for the UE 1306. When RF conditions experienced by the UE 1306 are determined to be poor, the network entity 1312 may coordinate with the PPC 1302 and the SCC 1304 HARQ entities to schedule (by default) duplicate retransmissions 1314*a-b* for all control-plane data communications transmitted to the UE 1306 while the RF signaling conditions remain poor.

In this scenario, the PCC 1302 may transmit an initial Tx Data A (including control-plane data) to the UE 1306 over a first communication link 1308. The network may then employ the PCC's 1302 HARQ entity to retransmit a first copy of the ReTx Data A1 to the UE's 1306 first HARQ entity via a first communication link 1316*a*; the network may similarly employ the SCC's 1304 HARQ entity to retransmit a second copy of the ReTx Data A2 to the UE's 1306 first HARQ entity via a second communication link 1316*b*. Upon receiving the first and second copies of the ReTx Data A1 and A2 by the UE's 1306 respective first and second HARQ entities, the ReTx Data A1 and A2 can be passed through the MAC layer 1318 to the RLC layer 1320, which will utilize only one copy of the ReTx Data A1 or A2 for subsequent processing 1324. The remainder of ReTx Data A1 or A2 that is not utilized can be discarded 1322 at the RLC layer 1320 of the UE 1306.

Figure 14:
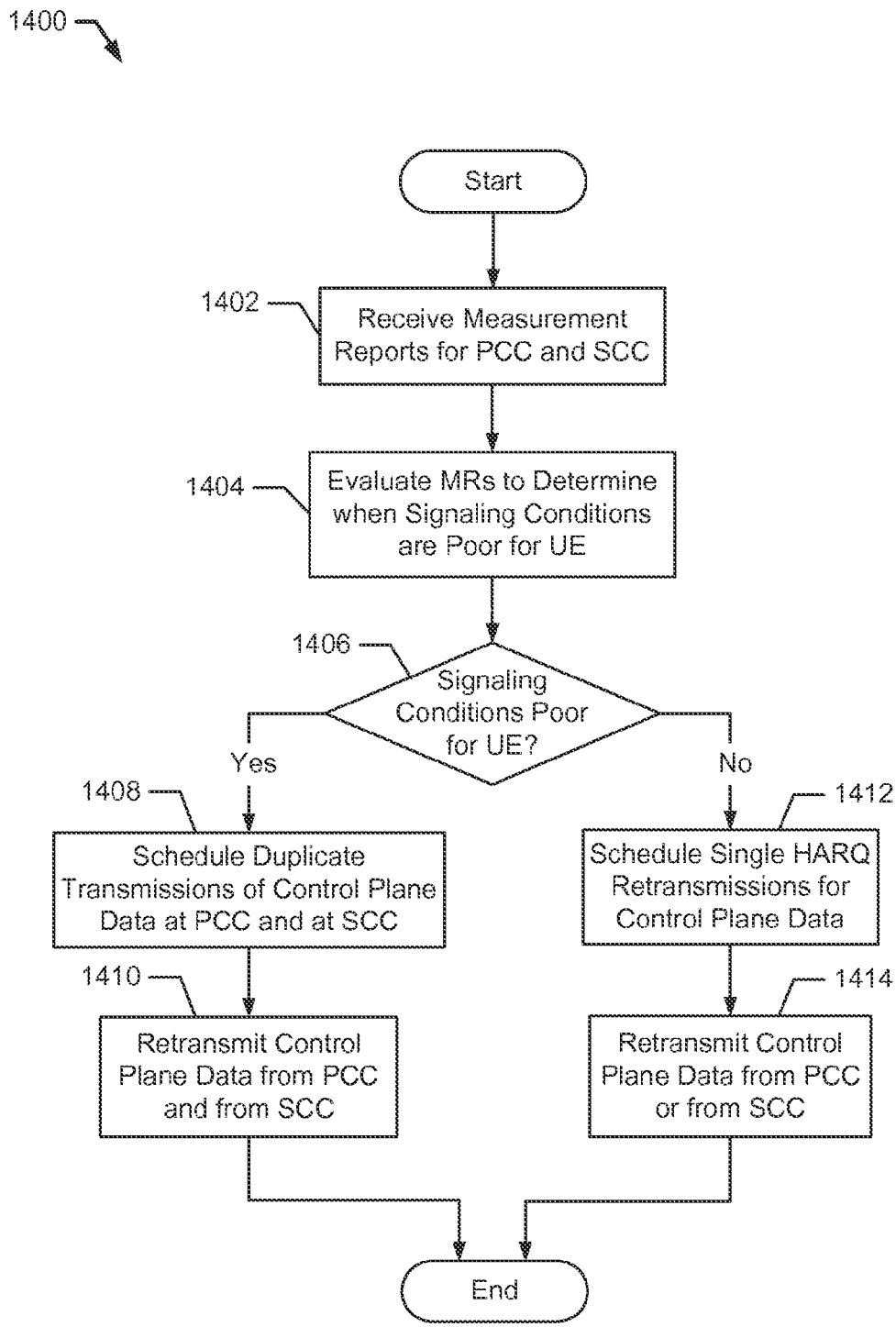
FIG. 14 shows a flowchart depicting a procedure for performing dynamic HARQ retransmissions of control-plane data, in accordance with some implementations of the disclosure.

FIG. 14 shows a flowchart depicting a procedure 1400 for performing dynamic HARQ retransmissions of control-plane data (e.g., NAS or RRC control information), in accordance with some implementations of the disclosure. In this regard, it should be understood that any or all of the procedures 1400 depicted in FIG. 14 may be associated with a method, or methods, that can be implemented by the execution of computer program instructions stored in a non-transitory computer-readable memory 506 of the network apparatus 500, and optionally, in conjunction with the execution of computer program instructions stored in a non-transitory computer-readable memory 606 of a wireless communication device 600.

Initially, at operation block 1402, a network apparatus 500 (e.g., an MME or an eNodeB base station) associated with a PCC 1302 or an SCC 1304 may receive MR information corresponding the RF conditions experienced by the UE 1306 for communications with the PCC 1302 and the SCC 1304. Next, at operation block 1404, the network apparatus 500 can evaluate the MRs to determine whether network signaling conditions are poor, e.g., from the perspective of the UE 1306 for the PCC 1302 and/or the SCC 1304. At decision block 1406, a determination can be made as to whether network signaling conditions are poor for the UE 1306. In a scenario where network signaling conditions are determined not to be poor, at operation block 1412, the network apparatus 500 can schedule a single HARQ retransmission for control-plane data, e.g., when a corresponding NACK is received by the network. Then, at operation block 1414 the single HARQ retransmission for the control-plane data may be communicated to the UE 1306 from either the PCC 1302 or the SCC 1304.

Alternatively, in a scenario where network signaling conditions are determined to be poor, at operation block 1408, the network apparatus 500 can schedule a duplicate transmission, i.e., the same RLC protocol data unit (PDU), containing control-plane data for both the PCC 1302 and the SCC 1304. Then, at operation block 1410, the PCC 1302 and the SCC 1304 can retransmit respective, duplicate copies of the control plane data to the UE 1306, to ensure that the time-sensitive control-plane data is received by the UE 1306 in a timely manner.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method for designating control plane signaling operations between a primary network cell and a secondary network cell of a Long Term Evolution (LTE) network, the method comprising:

at a network apparatus in communication with a mobile device that communicates with the LTE network via both the primary network cell and the secondary network cell:
  evaluating one or more network conditions associated with downlink communication to the mobile device via the primary network cell and one or more network conditions associated with downlink communication to the mobile device via the secondary network cell;
  determining whether to communicate control plane data to the mobile device via the primary network cell, via the secondary network cell, or via both the primary and secondary network cells based at least in part on the evaluating; and
  sending the control plane data to the mobile device via the primary network cell, via the secondary network cell, or via both the primary and secondary network cells based at least in part on the determining.

2. The method of claim 1, wherein:
the control plane data corresponds to non-access stratum (NAS) information or radio resource control (RRC) information; and
the network apparatus is an enhanced NodeB (eNodeB) base station or a mobility management entity (MME) of the LTE network.

3. The method of claim 1, wherein:
the primary network cell is a primary carrier cell of the mobile device and the secondary network cell is a secondary carrier cell of the mobile device; and
the primary carrier cell and secondary carrier cell provide communication using carrier aggregation for the mobile device within the LTE network.

4. The method of claim 3, wherein the primary network cell and the secondary network cell communicate with the mobile device using inter-band non-contiguous component carriers that utilize different frequency resources within different radio frequency (RF) bands.

5. The method of claim 1, further comprising:
receiving at least one measurement report (MR) from the mobile device,
wherein the at least one MR includes information corresponding to the one or more network conditions associated with downlink communication to the mobile device via the primary network cell and information corresponding to the one or more network conditions associated with downlink communication to the mobile device via the secondary network cell.

6. The method of claim 5, wherein the at least one MR comprises one or more of: a channel quality indicator (CQI), a pre-coding matrix indicator (PMI), or a rank indicator (RI) for the primary network cell, and one or more of: a CQI, a PMI, or a RI for the secondary network cell.

7. The method of claim 1, wherein:
the one or more network conditions associated with downlink communication to the mobile device via the primary network cell are measured radio frequency (RF) conditions of the primary network cell that comprise at least one of:
a reference signal received power (RSRP),
a received signal strength indication (RSSI), or
a signal to interference plus noise ratio (SINR); and
the one or more network conditions associated with the downlink communication to the mobile device via secondary network cell are measured RF conditions of the secondary network cell that comprise at least one of: the RSRP, the RSSI, or the SINR.

8. The method of claim 1, further comprising:
evaluating at least one of:
  a circuit-switched fallback (CSF) condition for the mobile device, or
  block error rate (BLER) information for instantaneous downlink hybrid automatic repeat request (HARQ) at the network apparatus or for instantaneous uplink HARQ at the mobile device,
wherein the determining whether to communicate control plane data to the mobile device via the primary network cell, via the secondary network cell, or via both the primary and second network cells is further based at least in part on the evaluating the at least one of the CSF condition for the mobile device or the BLER information.

9. The method of claim 1, wherein the network apparatus sends the control plane data to the mobile device:
via the primary network cell when the one or more network conditions associated with downlink communication to the mobile device via the primary network cell are better than the one or more network conditions associated with downlink communication to the mobile device via the secondary network cell;
via the secondary network cell when the one or more network conditions associated with downlink communication to the mobile device via the secondary network cell are better than the one or more network conditions associated with downlink communication to the mobile device via the primary network cell; and
via the primary network cell by default.

10. The method of claim 1, further comprising:
continuing to send the control plane data to the mobile device via the primary network cell, via the secondary network cell, or via both the primary and secondary network cells during a network selected time interval or until a measurement report (MR) is received from the mobile device.

11. A network apparatus, comprising:
one or more processors; and
a storage device storing executable instructions that, when executed by the one or more processors, cause the network apparatus to:
  receive a measurement report (MR) from a user equipment (UE) communicating within a Long Term Evolution (LTE) network;
  evaluate the MR received from the UE to determine whether to communicate control plane data in the downlink direction to the UE via a primary carrier cell (PCC), via a secondary carrier cell (SCC), or via both the PCC and the SCC, the PCC and the SCC providing communication with carrier aggregation for the UE within the LTE network; and
  send the control plane data to the UE via the PCC, via the SCC, or via both the PCC and the SCC based at least in part on evaluation of the MR received from the UE.

12. The network apparatus of claim 11, wherein the network apparatus sends duplicate copies of the control plane data to the UE via both the PCC and the SCC when the MR indicates that radio frequency (RF) conditions are poor for downlink communication to the UE within the LTE network.

13. The network apparatus of claim 12, wherein the duplicate copies of the control plane data sent to the UE via both the PCC and the SCC are hybrid automatic repeat request (HARM) retransmissions of control plane data previously sent to the UE via the PCC or via the SCC.

14. The network apparatus of claim 11, wherein the network apparatus communicates the control plane data to the UE:
via the PCC when the MR indicates that radio frequency (RF) conditions for downlink communication to the UE via the PCC are better than RF conditions for downlink communication to the UE via the SCC; and
via the SCC when the MR indicates that RF conditions for downlink communication to the UE via the SCC are better than RF conditions for downlink communication to the UE via the PCC.

15. The network apparatus of claim 14, wherein the control plane data sent to the UE via the PCC or the SCC is a hybrid automatic repeat request (HARM) retransmission of control plane data previously sent to the UE via the PCC or the SCC.

16. The network apparatus of claim 11, wherein the PCC and the SCC communicate with the UE using inter-band non-contiguous component carriers that utilize different frequency resources within different radio frequency (RF) bands.

17. The network apparatus of claim 11, wherein the MR comprises one or more of: a channel quality indicator (CQI), a pre-coding matrix indicator (PMI), or a rank indicator (RI) for the PCC, and one or more of: a CQI, a PMI, or a RI for the SCC.

18. A non-transitory computer readable medium storing executable instructions that, when executed by one or more processors of a network apparatus, cause the network apparatus to:
receive a measurement report (MR) from a user equipment (UE) communicating within a Long Term Evolution (LTE) network;
evaluate the MR received from the UE to determine whether to communicate control plane data in the downlink direction to the UE via a primary carrier cell (PCC), via a secondary carrier cell (SCC), or via both the PCC and the SCC, the PCC and the SCC providing communication with carrier aggregation for the UE within the LTE network; and
send duplicate copies of the control plane data to the UE via both the PCC and the SCC when the MR indicates that radio frequency conditions (RF) are poor for the UE within the LTE network.

19. The non-transitory computer readable medium of claim 18, wherein the duplicate copies of the control plane data sent to the UE via both the PCC and the SCC are hybrid automatic repeat request (HARQ) retransmissions of control plane data previously sent to the UE via the PCC or via the SCC.

20. The non-transitory computer readable medium of claim 18, wherein the PCC and the SCC communicate with the UE using inter-band non-contiguous component carriers that utilize different frequency resources within different radio frequency (RF) bands.

* * * * *

UNITED STATES PATENT AND TRADEMARK OFFICE
CERTIFICATE OF CORRECTION

PATENT NO. : 9,537,612 B2  
APPLICATION NO. : 14/503106  
DATED : January 3, 2017  
INVENTOR(S) : Kodali et al.

Page 1 of 1

It is certified that error appears in the above-identified patent and that said Letters Patent is hereby corrected as shown below:

In the Claims

In Claim 13, Column 24, Line 66: "request (HARM) retransmissions" should read -- request (HARQ) retransmissions --.

In Claim 15, Column 25, Line 14: "request (HARM) retransmission" should read -- request (HARQ) retransmission --.

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*